United States Patent
Farkas et al.

(10) Patent No.: US 9,614,371 B1
(45) Date of Patent: Apr. 4, 2017

(54) INTERFACE SYSTEMS AND METHODS FOR PORTABLE STRUCTURES

(71) Applicant: Tsuga Engineering LLC, Bellingham, WA (US)

(72) Inventors: George Farkas, Bellingham, WA (US); Daniel Krones, Mission Viejo, CA (US); Wesley Ellis, Bellingham, WA (US)

(73) Assignee: TSUGA ENGINEERING LLC, Bellingham, WA (US)

( * ) Notice: Subject to any disclaimer, the term of this patent is extended or adjusted under 35 U.S.C. 154(b) by 0 days.

(21) Appl. No.: 14/820,401

(22) Filed: Aug. 6, 2015

Related U.S. Application Data

(60) Provisional application No. 62/034,111, filed on Aug. 6, 2014.

(51) Int. Cl.
*H02J 3/14* (2006.01)
*H02J 1/00* (2006.01)
*H02J 7/00* (2006.01)
*H02J 5/00* (2016.01)

(52) U.S. Cl.
CPC ....... *H02J 1/00* (2013.01); *H02J 3/14* (2013.01); *H02J 5/005* (2013.01); *H02J 7/0054* (2013.01)

(58) Field of Classification Search
CPC ......... H02J 3/14; H02J 5/005; Y02B 70/3225; G06F 13/4045
USPC .......................................................... 307/29
See application file for complete search history.

(56) References Cited

U.S. PATENT DOCUMENTS

| 5,691,897 | A | 11/1997 | Brown et al. |
| 5,929,597 | A | 7/1999 | Pfeifer et al. |
| 6,504,343 | B1 | 1/2003 | Chang |
| 7,317,896 | B1 * | 1/2008 | Saxena ................. A45C 13/02 200/51.03 |

(Continued)

FOREIGN PATENT DOCUMENTS

WO    2009132193    10/2009

OTHER PUBLICATIONS

PCT International Searching Authority, International Search Report, PCTUS2013022779, Apr. 18, 2013, 7 pages.

(Continued)

*Primary Examiner* — Jared Fureman
*Assistant Examiner* — Alfonso Perez Borroto
(74) *Attorney, Agent, or Firm* — Michael R. Schacht; Schacht Law Office, Inc.

(57) ABSTRACT

An interface system for a portable structure, at least one power supply, at least one wired functional device, and at least one wireless functional device. A power interface is operatively connected to the at least one power supply. A wired interface is operatively connected to the at least one wired functional device. A wireless interface is wirelessly connected to the at least one wireless functional device. A controller is operatively connected to the power interface, the wired interface, and the wireless interface. The controller controls the power interface to distribute power from the at least one power supply to the at least one wired functional device. The controller controls the wired interface to distribute at least one of commands and data to the wired functional device. The controller controls the wireless interface to distribute at least one of commands and data to the wireless functional device.

20 Claims, 12 Drawing Sheets

(56) References Cited

U.S. PATENT DOCUMENTS

| | | |
|---|---|---|
| 8,629,651 B2 | 1/2014 | Guccione et al. |
| 2004/0155631 A1 | 8/2004 | Ishizu |
| 2006/0139011 A1 | 6/2006 | Yang |
| 2006/0267547 A1 | 11/2006 | Godovich |
| 2007/0210750 A1 | 9/2007 | Cha |
| 2008/0053716 A1 | 3/2008 | Scheucher |
| 2008/0054842 A1 | 3/2008 | Kim et al. |
| 2008/0211458 A1* | 9/2008 | Lawther ............... H02J 7/025 320/132 |
| 2009/0145321 A1* | 6/2009 | Russell ................. F42B 4/00 102/215 |
| 2009/0161806 A1* | 6/2009 | Ananny .............. G06F 13/4045 375/354 |
| 2009/0267562 A1 | 10/2009 | Guccione et al. |
| 2011/0068741 A1 | 3/2011 | Liu |
| 2011/0316472 A1 | 12/2011 | Han et al. |
| 2013/0200841 A1 | 8/2013 | Farkas et al. |

OTHER PUBLICATIONS

Microsoft Corporation; "WOSA Backgrounder: Delivering Enterprise Services to the Windows-based Desktop", Jul. 1, 1993, Backgrounders and Whitepapers: Operating Systems Extensions—MSDN Archive Edition, pp. 1-19.

\* cited by examiner

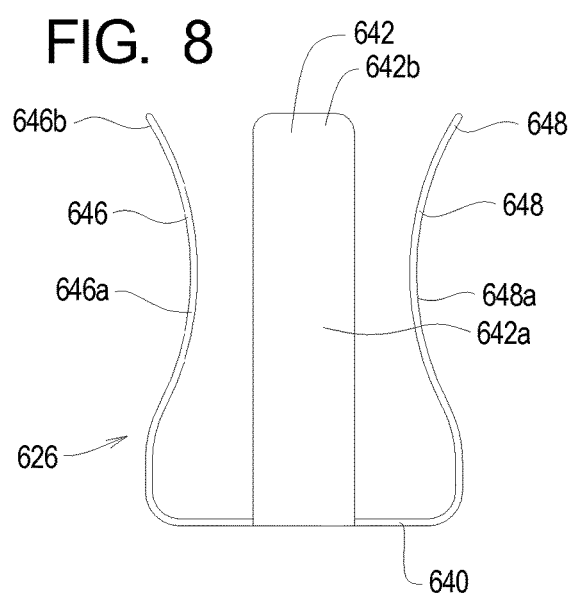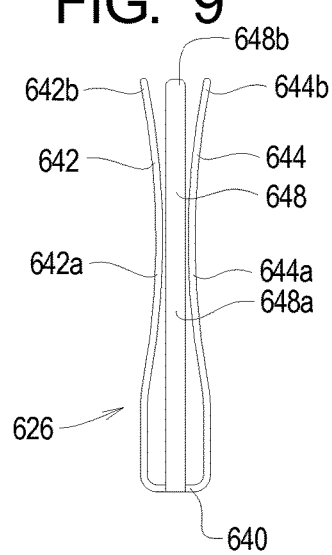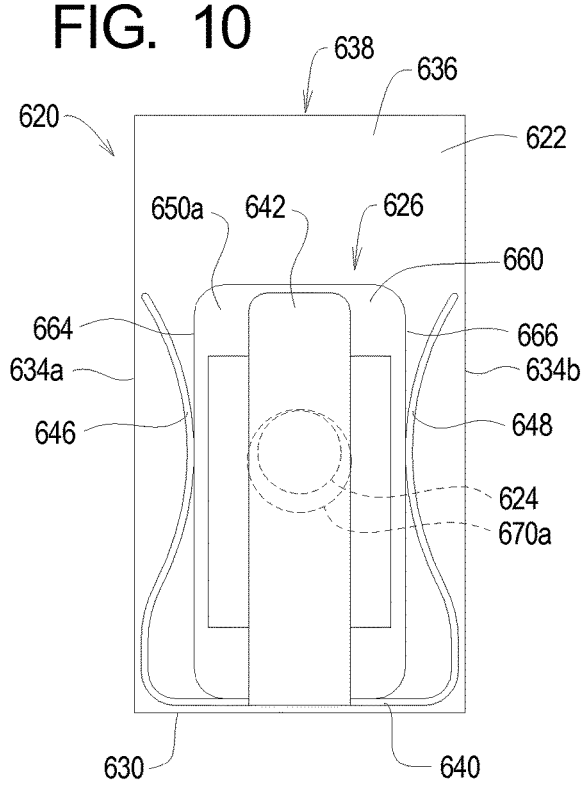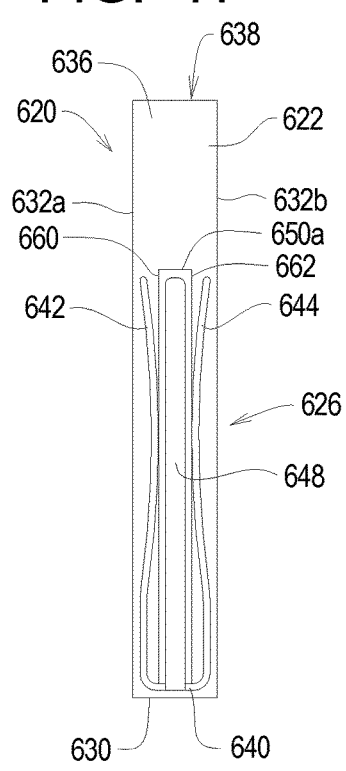

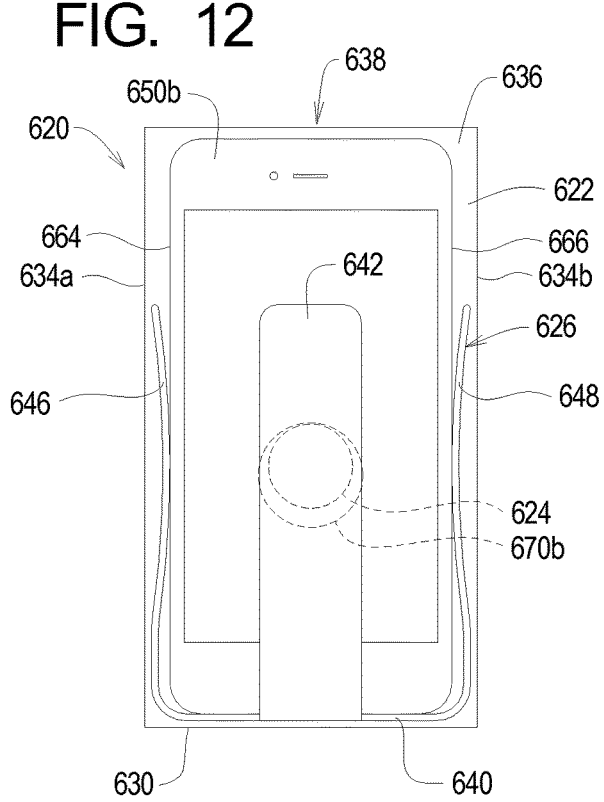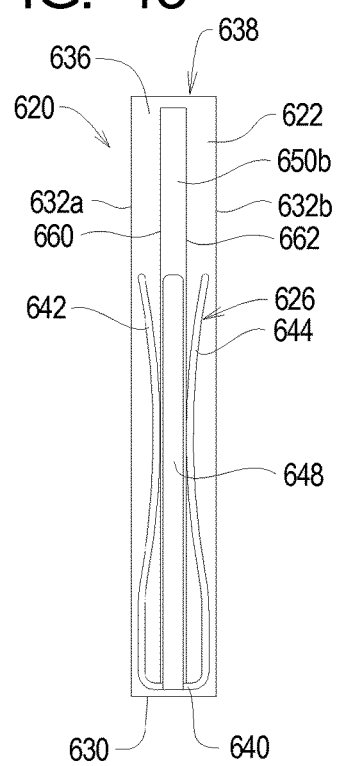

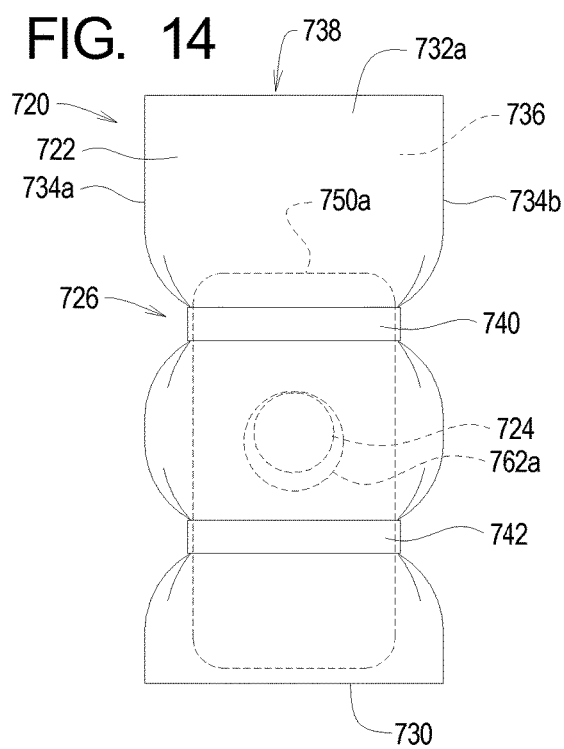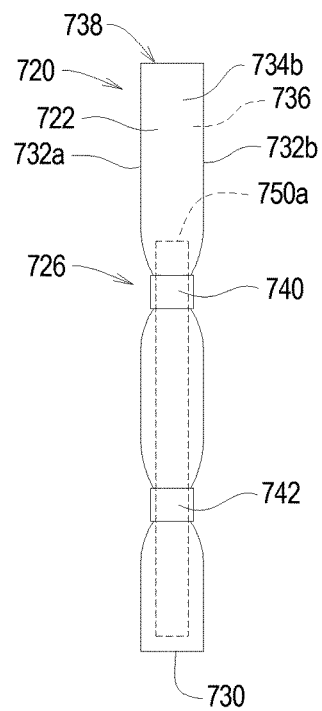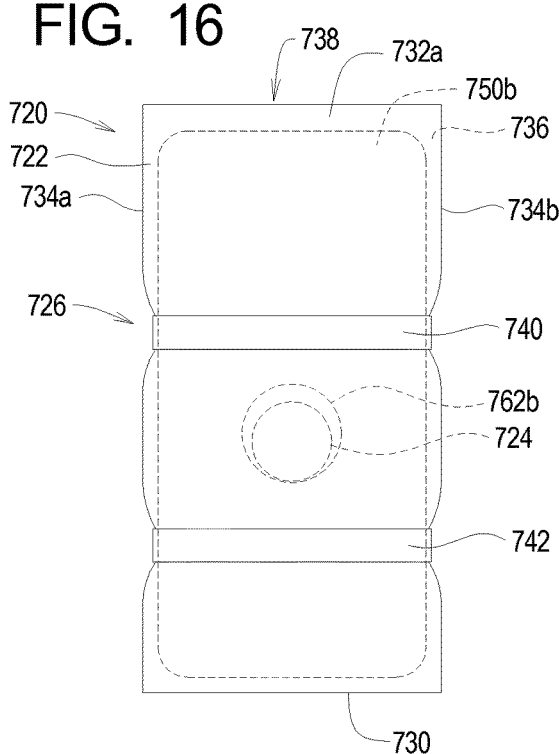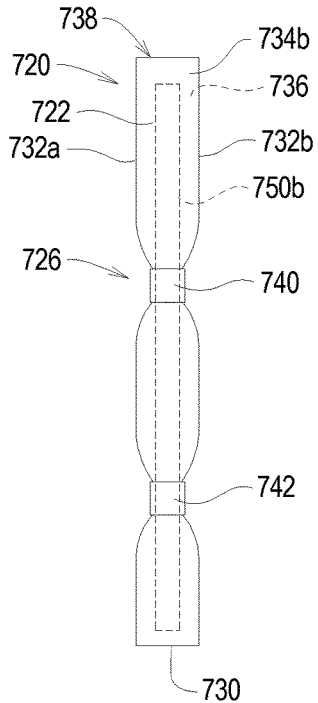

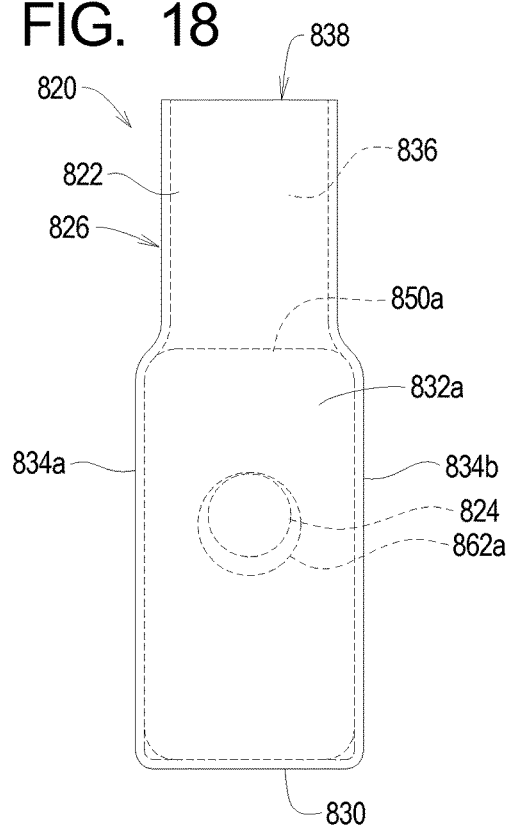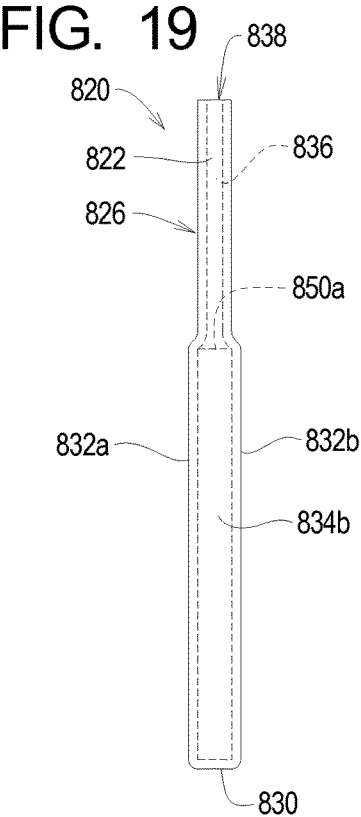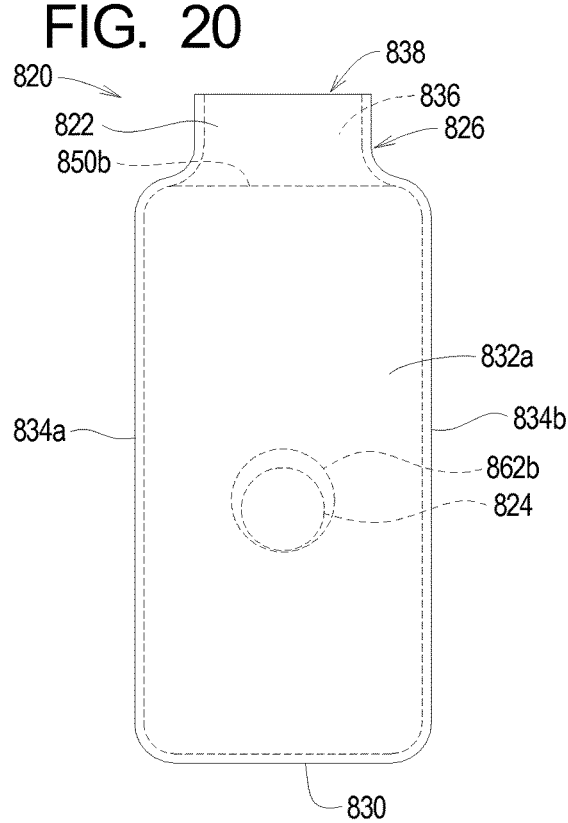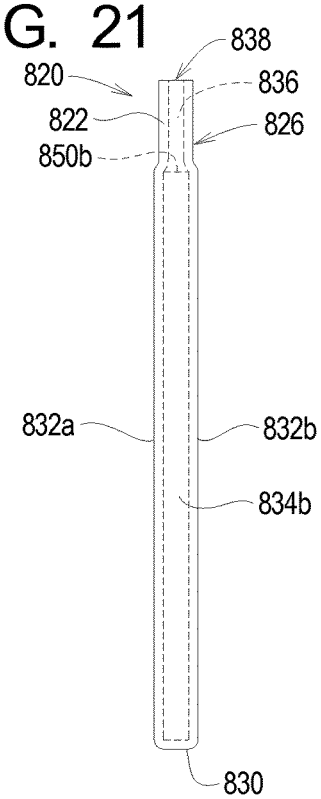

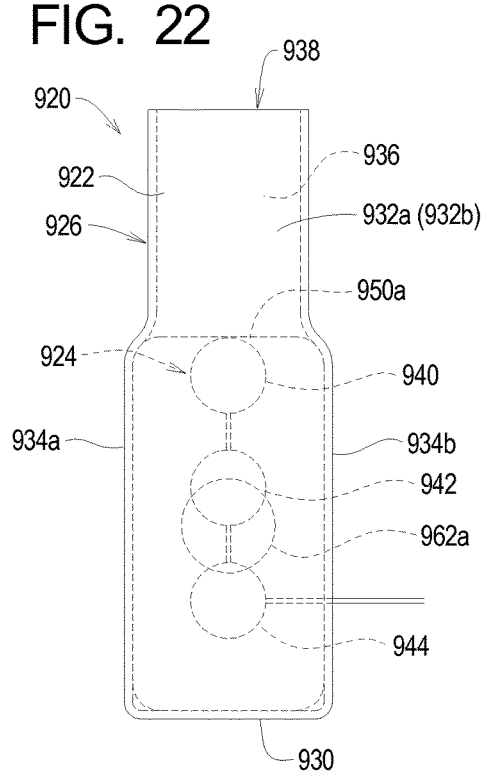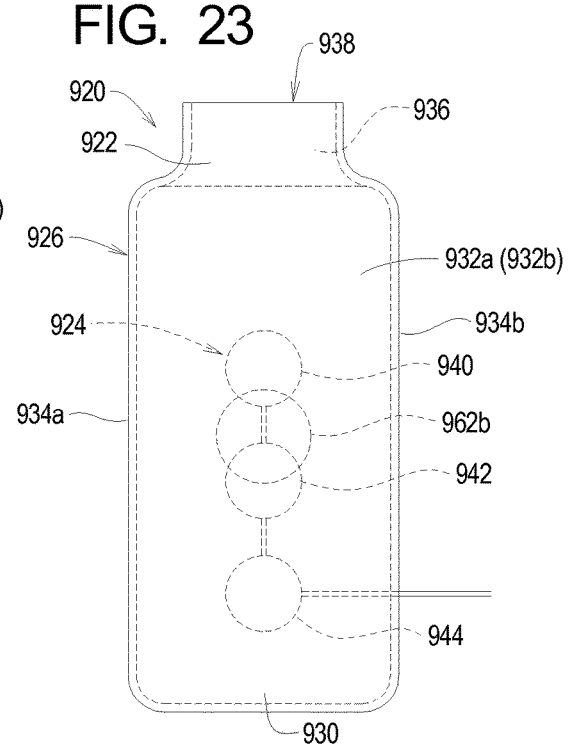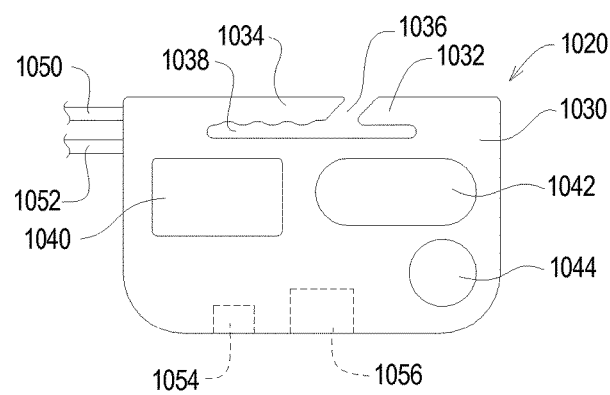

INTERFACE SYSTEMS AND METHODS FOR PORTABLE STRUCTURES

RELATED APPLICATIONS

This application, U.S. patent application Ser. No. 14/820,401 filed Aug. 6, 2015 claims benefit of U.S. Provisional Application Ser. No. 62/034,111 filed Aug. 6, 2014, the contents of which are incorporated herein by reference.

TECHNICAL FIELD

The present invention relates to portable structures such as bags, backpacks, clothing, and camping equipment and, more particularly, to interface systems for routing and controlling power and data signals among power supplies, peripherals, and user interface devices designed for use with such portable structures.

BACKGROUND

Portable electronic devices typically contain batteries for providing power when utility power is not available. Depending on various factors, it may be necessary to recharge a depleted battery when utility power is still unavailable, so portable battery packs have been developed to provide additional power to portable electronic devices. As described in U.S. patent application Ser. No. 13/748,385, portable battery packs may be incorporated into portable structures, such as purses, backpacks, and the like, where the weight of the battery pack is not too noticeable and the portable structure is nearby when a battery needs to be recharged.

In addition, such portable structures may incorporate or be used in conjunction with structure electronic devices such as sensors, actuators, motors, and the like to perform functions related to features of the portable structure (e.g., zippers, buckles, flaps, and the like). In this case, the structure electronic devices may require power, and it may not be convenient or feasible to associate a battery with each one of these structure electronic devices. Further portable structures may be provided with additional features not specifically related to function of the portable structure itself (e.g., solar panels, heaters, etc.). Accordingly, a single battery may be supported by the portable structure to provide power to a plurality of such structure electronic devices.

The present invention generally relates to systems and methods for portable structures that can distribute power, command, and data throughout the portable structure and communicate wirelessly to devices outside of the portable structure.

SUMMARY

The present invention may be embodied as an interface system for a portable structure. The interface system operatively connects at least one power supply, at least one wired functional device, and at least one wireless functional device and comprises a power interface, a wired interface, a wireless interface, and a controller. The power interface is operatively connected to the at least one power supply. The wired interface is operatively connected to the at least one wired functional device. The wireless interface is wirelessly connected to the at least one wireless functional device. The controller is operatively connected to the power interface, the wired interface, and the wireless interface. The controller controls the power interface to distribute power from the at least one power supply to the at least one wired functional device. The controller controls the wired interface to distribute at least one of commands and data to the wired functional device. The controller controls the wireless interface to distribute at least one of commands and data to the wireless functional device.

BRIEF DESCRIPTION OF THE DRAWINGS

FIG. 8 is a front elevation view of a support structure of a first example pocket assembly of the present invention;

FIG. 9 is a side elevation view of the support structure of the first example pocket assembly of the present invention;

FIG. 10 is a front elevation view of the first example pocket assembly of the present invention containing a first example smartphone;

FIG. 11 is a side elevation view of the first example pocket assembly of the present invention containing the first example smartphone;

FIG. 12 is a front elevation view of the first example pocket assembly of the present invention containing a second example smartphone;

FIG. 13 is a side elevation view of the first example pocket assembly of the present invention containing the second example smartphone;

FIG. 14 is a front elevation view of a second example pocket assembly of the present invention containing a first example smartphone;

FIG. 15 is a side elevation view of the second example pocket assembly of the present invention containing the first example smartphone;

FIG. 16 is a front elevation view of the second example pocket assembly of the present invention containing a second example smartphone;

FIG. 17 is a side elevation view of the second example pocket assembly of the present invention containing the second example smartphone;

FIG. 18 is a front elevation view of a third example pocket assembly of the present invention containing a first example smartphone;

FIG. 19 is a side elevation view of the third example pocket assembly of the present invention containing the first example smartphone;

FIG. 20 is a front elevation view of the third example pocket assembly of the present invention containing a second example smartphone;

FIG. 21 is a side elevation view of the third example pocket assembly of the present invention containing the second example smartphone;

FIG. 22 is a front elevation view of a fourth example pocket assembly of the present invention holding a first example smartphone;

FIG. 23 is a front elevation view of the fourth example pocket assembly of the present invention holding a second example smartphone; and FIG. 24 is a front elevation view of a hardware interface system of the present invention.

DETAILED DESCRIPTION

I. Generic Examples

Figure 1:
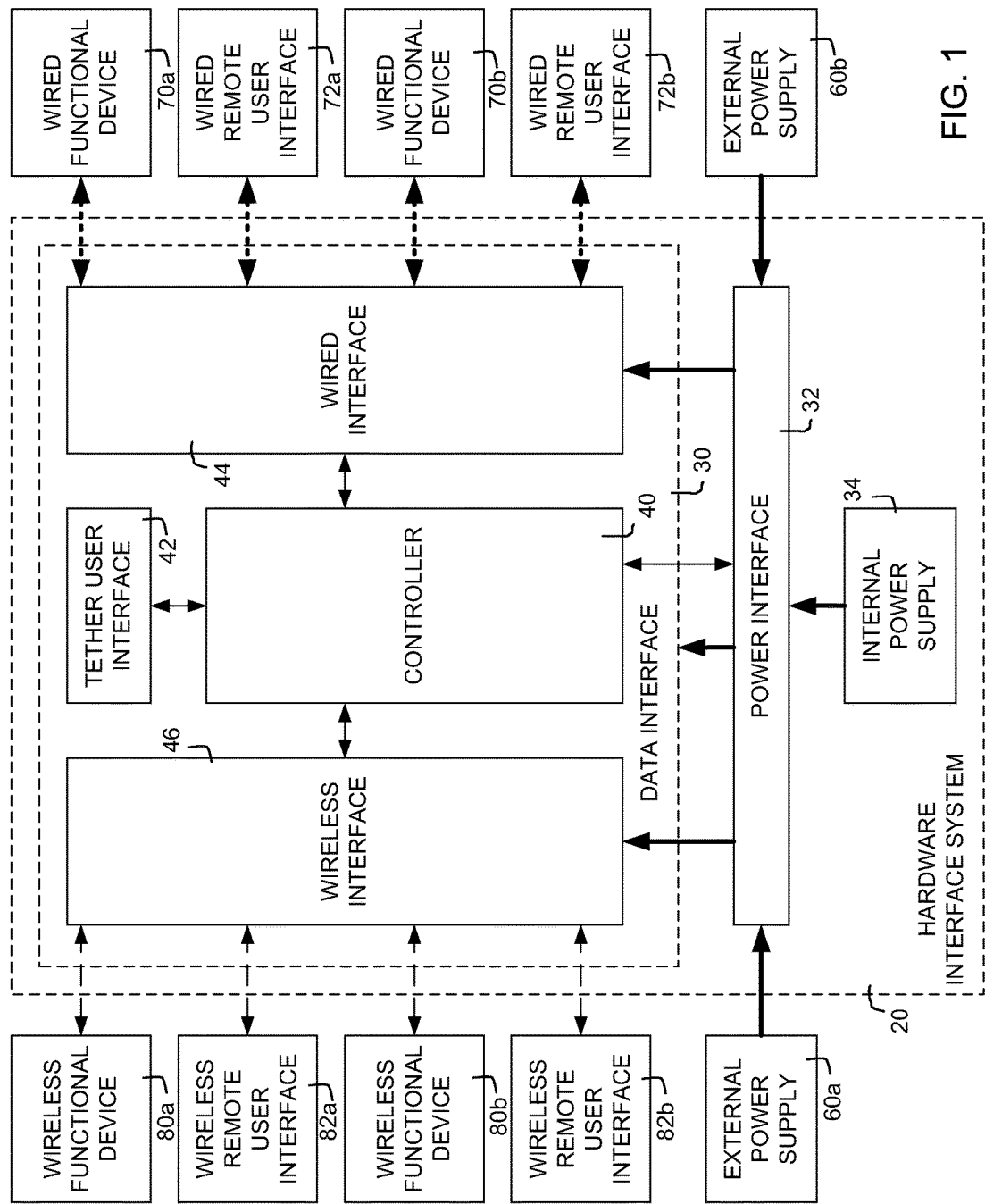
FIG. 1 is a generic block diagram depicting an example hardware interface system of the present invention.
Figure 2:
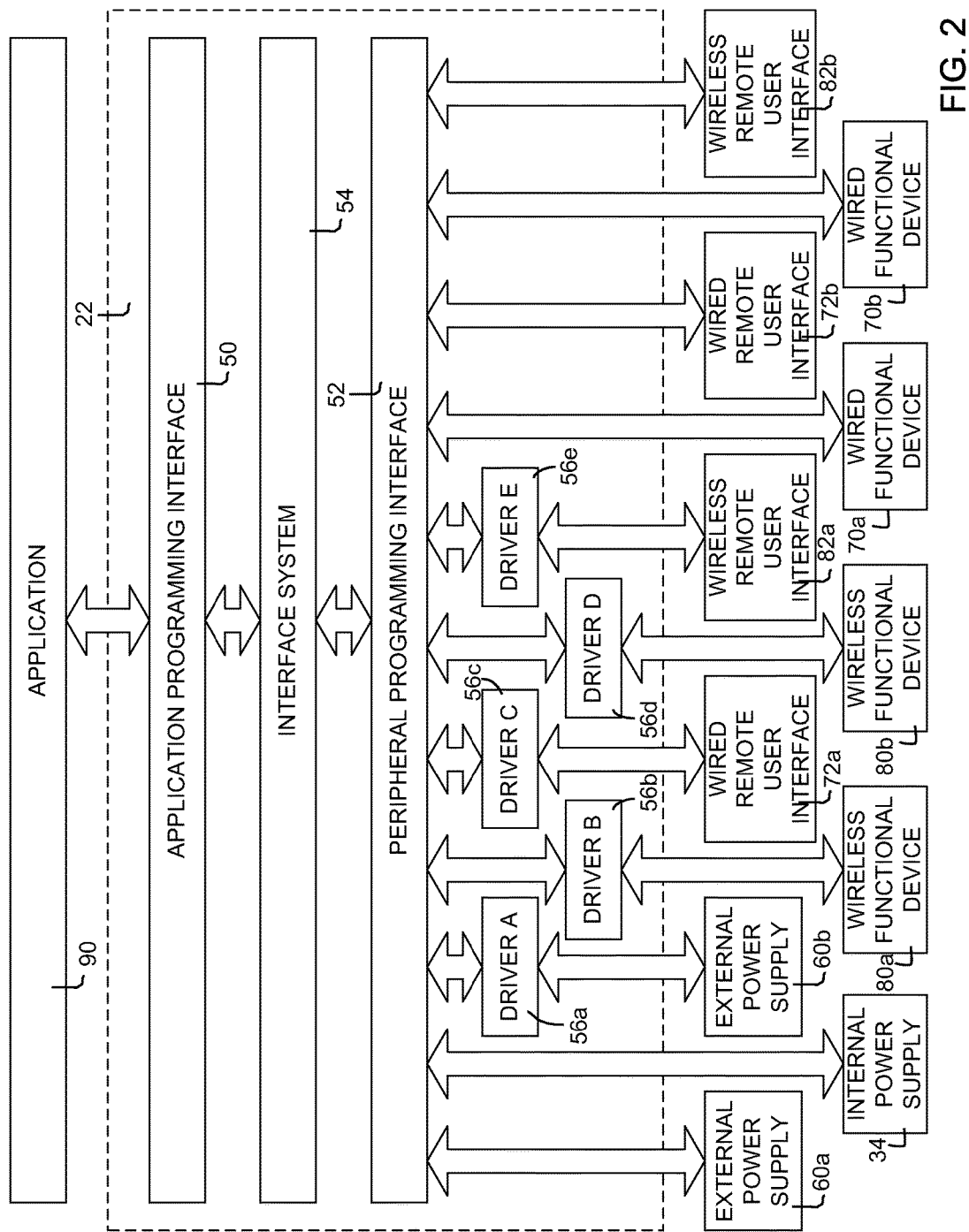
FIG. 2 is a generic block diagram depicting an example software interface system that may be used by the hardware interface system depicted in FIG. 1.

Referring initially to FIGS. 1 and 2 of the present invention, depicted at 20 in FIG. 1 is an example generic hardware interface system and at 22 in FIG. 2 is an example generic software interface system constructed in accordance with, and embodying, the principles of the present invention.

As shown in FIG. 1, the example generic hardware interface system 20 comprises a data interface 30, a power interface 32, and, optionally, an internal power supply 34. The data interface 30 comprises a controller 40, a tether user interface 42, a wired interface 44, and a wireless interface 46. The controller 40 is or may comprise any general purpose microprocessor capable of running the generic software interface system 22 depicted in FIG. 2. The tether user interface 42 may comprise lights, buttons, display screens, touch screens, or the like directly connected to, or mounted on, the generic hardware interface system 20 to allow input and/or output of data to a user of that system 20. The wired interface 44 is or may be any device capable of transmitting power and/or data through electrical or fiber optics conductors and will typically conform to industry standards such as USB and/or FireWire. The wireless interface 46 is or may be any device capable of transmitting data wirelessly and will typically conform to industry standards such as Bluetooth, WiFi, NFC, Ant, Zigbee, and/or RFID.

The power interface 32 allows power from multiple sources to be supplied to the data interface 30 and beyond. One such source is the internal power supply 34 depicted in FIGS. 1 and 2. An example of a power interface system that may be used as or in conjunction with the power interface 32 is described in U.S. patent application Ser. No. 13/748,385, and that application is incorporated herein by reference. The power interface 32 is further configured to allow multiple power sources, both internal (34) and external (60a and 60b), to be connected to hardware interface system 20. In this case, the power interface 32 would implement logic necessary to gather status information (i.e., remaining charge, temperature) from the various internal and external power sources and connect these power sources to the data interface 30 as appropriate.

The example power interface 32 may further provide power conversion and/or modulation as required by specific applications. In particular, power to charge a battery may require regulation of the voltage and current. Further, power drawn from a battery may require DC/DC conversion from a variable battery voltage of 3.0-4.2 to the operating which in the present technology is 5V. Also, in the case of driving LED lighting, the power interface must appropriately regulate the current to drive LED's. In the case of solar, power conversion could be used to balance the output voltage and current of the solar panels, targeting a "sweet spot" to achieve maximum efficiency for a given set of solar panel and lighting conditions.

For example, if one of the external power sources 60a is a battery and the other external power source 60b is a solar panel, the power interface 32 will draw power from the solar panel 60b when the sun is shining and use this power to charge the battery 60a and operate the data interface 30. At night or indoors, the power interface 32 will draw power from the battery 60a instead of the solar panel 60b.

FIG. 2 illustrates that the generic software interface system 22 comprises or defines an application programming interface 50, a peripheral programming interface 52, an interface system 54, and, optionally, one or more drivers 56. The reference character "56" will be used herein without an appended letter when used to identify the drivers 56 in general; lower case letters will be appended to the reference character "56" to differentiate individual drivers 56 in FIG. 2 or in this specification. The example generic software interface system 22 as depicted in FIG. 2 thus comprises a driver A identified by reference character 56a, a driver B identified by reference character 56b, a driver C identified by reference character 56c, a driver D identified by reference character 56d, and a driver E identified by reference character 56e.

FIGS. 1 and 2 further illustrate that the example generic hardware interface system 20 and example generic software interface system are operatively connected to one or more peripheral devices. Peripheral devices may be classified as wired devices, wireless devices, or external power supply devices. Certain of the peripheral devices may also be classified as user interface devices. User interface devices may be wired or wireless. As will be explained below, the example peripheral devices are designed to provide enhanced functionality to portable structures such as bags, backpacks, clothing, camping equipment, and the like. The example generic hardware interface system 20 and the example software system 22 are designed to facilitate the design of portable structures including such peripheral devices for the benefit of users of the portable structures and included peripheral devices.

FIGS. 1 and 2 depict the example interface systems 20 and 22 being used with first and second external power supplies 60a and 60b, first and second wired functional devices 70a and 70b, first and second wired remote user interface devices 72a and 72b, first and second wireless functional devices 80a and 80b, and first and second wireless remote user interface devices 82a and 82b. Again, the reference characters "60", "70", "72", "80", and "82" will be used herein without an appended letter when used to identify general classes of peripheral devices; lower case letters will be appended to these reference characters to differentiate individual peripheral devices in FIG. 1 or 2 or in this specification.

As will be explained in detail below, the number of power supplies 60 and wired devices 70 and 72 supported by the generic hardware interface system 20 is limited only by the number of physical connections provided by power interface 32 and the wired interface 44. Similarly, the number and type of wireless devices 80 and 82 supported by the generic hardware system 20 is limited only by the capability of the wireless communication system implemented by the wireless interface 46. The generic hardware interface system 20 allows peripheral devices to be combined in any manner suitable for a particular portable structure within certain hardware constraints.

The generic software interface system 22 also allows peripheral devices to be combined in any manner suitable for a particular portable structure. As shown in FIG. 2, the generic software interface system 22 may be represented as layers of software that isolate an application program 90 from the peripheral devices 60, 70, 72, 80, and 82. In particular, the application 90 communicates with, or is written to conform to, the application programming interface 50. The peripheral devices 60, 70, 72, 80, and 82 communicate with, or are created to conform to, the peripheral programming interface 52, either directly or through one of the drivers 56. The interface system 54 coordinates the transfer of data between the application programming interface 50 and the peripheral programming interface 52.

In the example depicted in FIG. 2, the external power supply 60b, wired peripheral 70a, wired remote user interface 72a, wireless functional device 80a, and wireless remote user interface 82a have not been created to conform to the peripheral programming interface 52 and thus require the drivers 56a, 56b, 56c, 56d, and 56e, respectively, to communicate with the peripheral programming interface 52. When required, the drivers 56 convert hardware data and power signals communicated between one or more peripheral formats defined by the peripheral devices 60a, 70a, 72a, 80a, and 82a into a peripheral programming interface (PPI) format defined by the peripheral programming interface 52. On the other hand, the internal power supply 34, external power supply 60b, wired peripheral 70b, wired remote user interface 72b, wireless functional device 80b, and wireless remote user interface 82b have been created to conform to the peripheral programming interface 52 and thus do not require a driver 56 to communicate with the peripheral programming interface 52. In this case, the peripheral formats defined by the peripheral devices 60b, 70b, 72b, 80b, and 82b conform to PPI format defined by the peripheral programming interface 52 and do not require conversion. The example generic hardware interface system 20 and the generic software interface system 22 thus, at a minimum, allows transfer of data, converted as necessary, between the application program 90 and the peripheral devices 60, 70, 72, 80, and 82.

In addition, the example application programming interface 50 defines API commands, the example peripheral programming interface 52 defines PPI commands, and the peripheral devices define peripheral commands. If necessary, the drivers 56 convert the PPI commands into peripheral commands. Similarly, the interface system 50 is capable of converting API commands into PPI commands. The hardware system 20 and software system 22 thus allow control commands to be sent from the application program 90 to the peripheral devices 60, 70, 72, 80, and 82. In some situations, the API command may be the same as the peripheral command, and the systems 20 and 22 simply pass the API command directly to the peripheral device 60, 70, 72, 80, and/or 82. In other situations, the API commands may differ from the PPI commands, in which case the interface system 54 may convert the API commands into corresponding PPI commands. In other situations, the PPI commands may differ from the peripheral commands, in which case the drivers 56 may convert the PPI commands into corresponding peripheral commands. And in yet other situations, one API command may correspond to a sequence of PPI commands, in which case the interface system 50 will handle the generation of the sequence of PPI commands based on the API commands. In still other situations, one PPI command may correspond to a sequence of peripheral commands, in which case the drivers 56 will handle the conversion of the PPI command into the sequence of peripheral commands. And it may be possible that, in some situations, two or more conversions occur as an API command is transmitted through the software system 22 to control a given peripheral device 60, 70, 72, 80, and/or 82.

To provide maximum functionality to application programmers, the API should be defined to provide access to a full range of actions that may be performed by the various peripheral devices. To design the API, a list of peripheral actions that could reasonably be anticipated to be performed by one or more of the peripheral devices is initially created. For each peripheral action on the list, an API command is defined. An API command can be a simple command that causes a single peripheral action and nothing more. An API command can be a parameter command that identifies a peripheral action and one or more parameters associated with that peripheral action. For programming ease, certain API commands may be compound commands that can contain one or more simple commands and/or parameter commands.

To provide maximum access by application programmers to the widest variety of makes and models of peripheral devices, the PPI should be defined to communicate peripheral commands to a full range of peripheral devices. The design of the PPI should thus allow the generation of peripheral commands for as many peripheral devices as possible. Ideally, PPI commands should be created to generate peripheral commands for all known peripheral devices. This is most easily accomplished by designing the peripheral devices to conform to the peripheral programming interface as generally discussed above. When one or more of the peripheral devices do not conform to the peripheral programming interface (unsupported peripheral device), a driver can be created for one or more makes and models of unsupported peripheral devices. With an appropriate driver, the peripheral programming interface need not be rewritten, and the application programmer may write the application program 90 without concern that unsupported devices will cause the system to fail.

The example interface system 54 handles transmission of data and commands between the application programming interface 50 and the peripheral programming interface 52. The example interface system 54 also performs logic steps when helpful or required to transmit such data and commands. For example, if a given compound API command does not have a corresponding compound PPI command, the interface system 54 may determine that the given compound API command is not supported by the peripheral programming interface and emulate the compound API command with a sequence of PPI commands. The example interface system 54 may further handle timing, data structure, and/or other differences between the application programming interface 50 and the peripheral programming interface 52.

Given the foregoing general description of the operation of the generic hardware interface system 20 and the generic hardware interface system 22, several examples of portable structures including specific hardware and software interface systems of the present invention will now be described with reference to FIGS. 3-6.

II. First Specific Example

Figure 3:
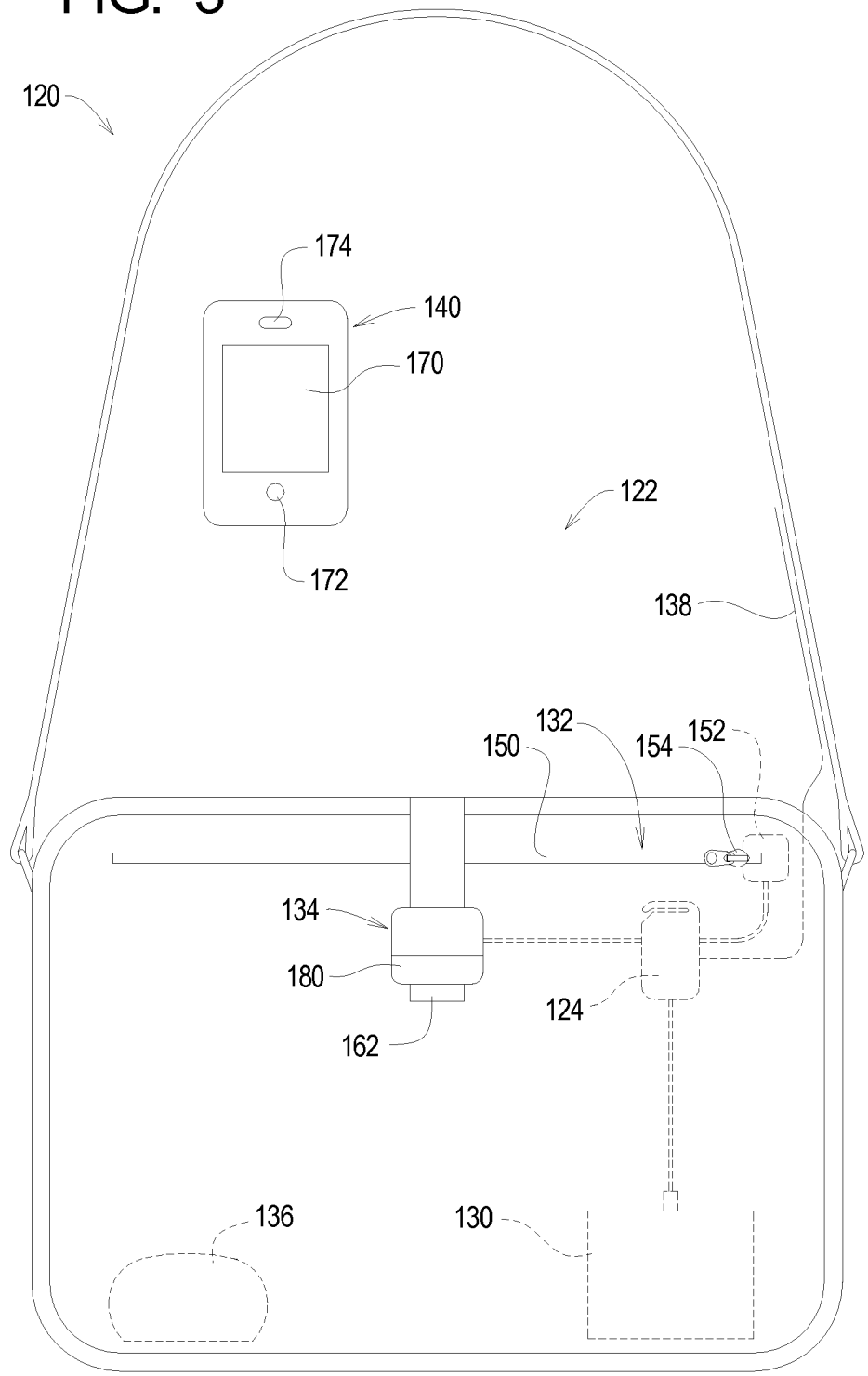
FIG. 3 is a front elevation of a bag such as a purse or briefcase illustrating the use of a first specific example interface system of the present invention.

Referring initially to FIG. 3 of the drawing, depicted therein is a bag 120 comprising a peripheral system 122 comprising a hardware interface system 124. The hardware interface system 124 may be, or incorporate, the generic hardware interface system 20 described above. The hardware interface system 124 may also implement the function of the example generic software interface system 22 described above. The example bag 120 could be a purse, briefcase, laptop case, or the like and will not be described in further detail below.

The example peripheral system 122 further comprises an external power supply 130, a zipper system 132, a buckle system 134, a wireless sensor 136, and, optionally, an antenna 138. The example peripheral system 122 may also further comprise a smartphone 140. The antenna 138 extends outside of the bag 120 and thus facilitates communication of the hardware interface system 124 with the externally located smartphone 140. The antenna 138 may be provided when the bag 120, or a portion thereof, is made of metallic material that would prevent the hardware interface system 124 from communicating wirelessly with the smartphone 140. For example, an external antenna is useful if the bag is metallic or blocks magnetic fields. In this case, an external antenna could allow the internal signal to be transmitted to an external cell phone. Otherwise the antenna will most likely be built into the hardware. Alternatively, the antenna could be external to the hardware and internal to the bag (e.g., built into the interior lining of the bag).

The example external power supply 130 is a battery, but other sources of electrical power may be employed. For example, if the bag 120 has wheels, the wheels may be connected to a generator that forms a power supply. If the bag 120 is often moved or shaken, the external power supply 130 may be or contain a device that converts kinetic energy of the bag to electrical energy. Another alternative to a battery would be a solar power panel arranged to convert solar energy to electrical energy. Further, while only a single external power supply 130 is shown in FIG. 3, two or more devices may be connected to the hardware interface system 124 as shown, for example, with the example generic hardware interface system depicted in FIG. 1.

The example zipper system 132 includes a mechanical zipper 150 and a zipper controller 152 capable of at least determining status of the mechanical zipper. For example, the zipper controller 152 may determine movement or location of a slider 154 of the mechanical zipper 150 or whether a latch (not shown) for holding the slider 154 in a closed position is latched or unlatched. The zipper controller 152 may further be capable of causing the zipper system 132 to change state; for example, the zipper controller 152 may contain an actuator for moving the zipper latch between the latched and unlatched configurations.

The example buckle system 134 includes a mechanical buckle 160 and a buckle controller 162 capable of at least determining status of the mechanical buckle. For example, the buckle controller 162 may determine whether the mechanical buckle 160 is latched or unlatched. The buckle controller 162 may further be capable of causing the buckle system 134 to change state; for example, the buckle controller 162 may contain an actuator for moving the buckle latch between the latched and unlatched configurations.

The example wireless sensor 136 may be a battery powered motion detector or the like. In the case of the bag 120, the wireless sensor 136 formed by a motion detector may send data to the hardware interface system 124 indicating, for example, that the bag is moving. Two types of motion sensors may be used. The first would simply detect whether the bag itself moves. The second may be, for example, a NIR motion sensor, similar to a motion sensor for a home that detects if someone is moving outside the bag. The use of a sensor for detecting movement external to the bag may have application in surrounding awareness, theft warning, or, while camping, detecting the presence of an animal near the campground or outside of a tent.

The smartphone 140 is capable of communicating wirelessly with the hardware interface system 124. The smartphone 140 further will run a downloadable software bag control application. The bag control application running on the smartphone 140 may be or correspond to the application program 90 described above. In this case, the bag control application will wirelessly communicate with the application programming interface of the software interface system running on the hardware interface device 124 as generally described above. The application will use a touchscreen 170, buttons 172, and speaker 174 of the smartphone 140 to allow the user of the bag 120 to interface with the bag control application.

The smartphone 140 running the bag control application thus allows the user to control parameters of the hardware interface device 124 and allow the hardware device 124 to communicate alerts, alarms, and other status information to the user. For example, using the bag control application, the user may set the parameters of the hardware interface system 124 such that the hardware interface system notifies the user, through the speaker 174, whenever the smartphone 140 is greater than a predetermined distance from the hardware interface system 124 and/or the wireless sensor 136 indicates that the bag 120 is moving. As another example, the user may set the parameters of the hardware interface system 124 such that the hardware interface system notifies the user, through the speaker 174, whenever the slider 154 of the zipper system 132 moves or the buckle 160 of the buckle system 134 is unlatched. If the zipper system 132 contains an actuator for operating the zipper latch, the user may use the hardware interface system 124 to operate the zipper latch such that the slider 154 of the zipper system 132 may not be moved out of its closed position. This notification may be accomplished by causing the cell phone to make a sound, vibrate, and/or illuminate the screen and/or an integral or external LED light.

III. Second Specific Example

Figure 4:
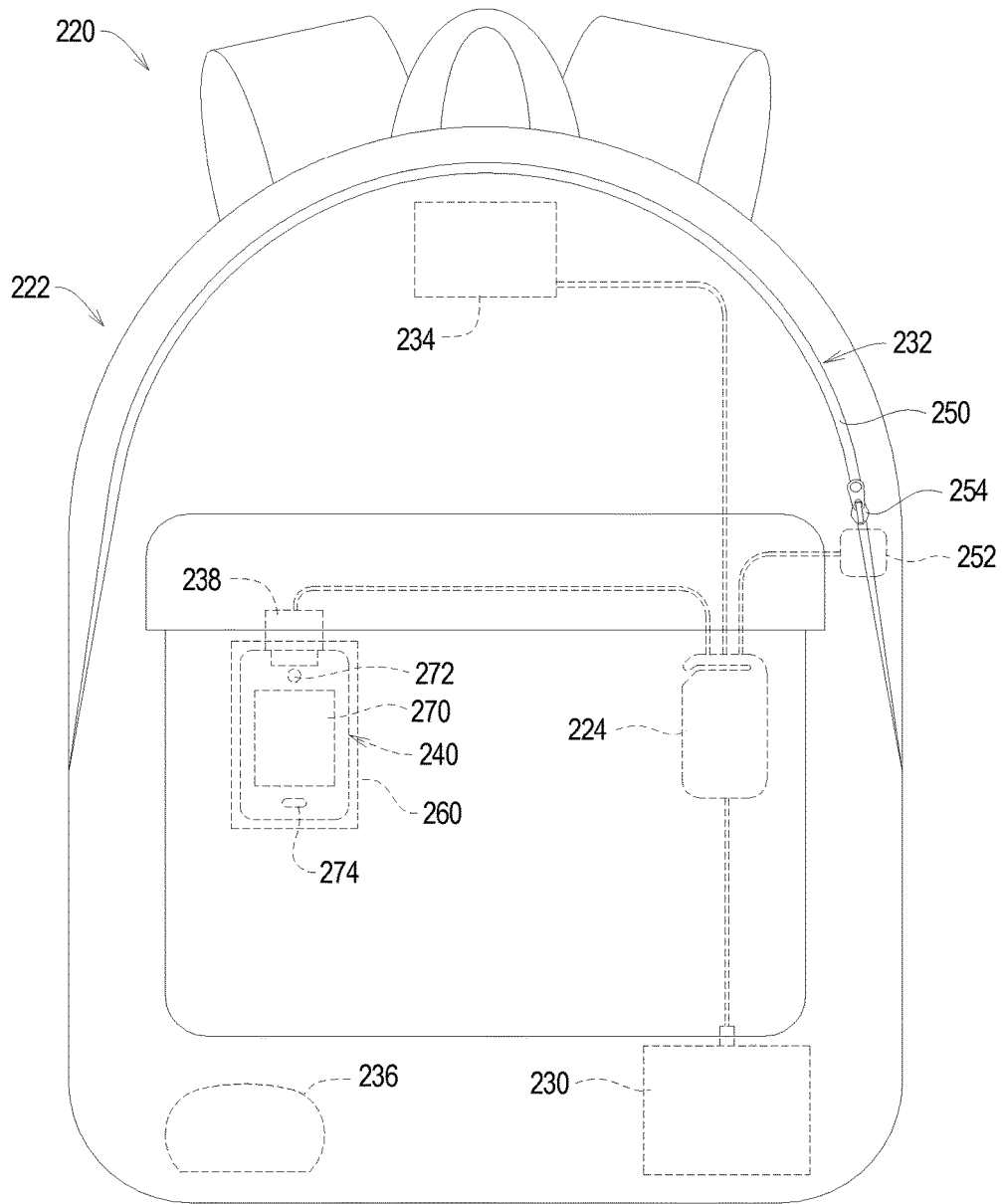
FIG. 4 is a front elevation view of a backpack illustrating the use of a second specific example interface system of the present invention.

Referring now to FIG. 4 of the drawing, depicted therein is a backpack 220 comprising a peripheral system 222 comprising a hardware interface system 224. The hardware interface system 224 may be, or incorporate, the generic hardware interface system 20 described above. The hardware interface system 224 may also implement the function of the example generic software interface system 22 described above. The example backpack 220 is or may be conventional and will not be described in further detail below.

The example peripheral system 222 further comprises an external power supply 230, a zipper system 232, an electroluminescent panel 234, a wireless sensor 236, and a phone charger 238. The example peripheral system 222 may also further comprise a smartphone 240. The exact number and type of peripherals (e.g., zipper system 232, electroluminescent panel 234, and wireless sensor 236) may vary depending on the nature of a particular system. For example, although the example peripheral system 222 comprises an electroluminescent panel, other types of displays, such as LCD, LED, OLED, or the like may be used in addition or instead.

The example external power supply 230 is a battery, but other sources of electrical power may be employed. For example, if the backpack 220 has wheels, the wheels may be connected to a generator that forms a power supply. If the backpack 220 is often moved or shaken, the external power supply 230 may be or contain a device that converts kinetic energy of the backpack to electrical energy. Another alternative to a battery would be a solar power panel arranged to convert solar energy to electrical energy. Further, while only a single external power supply 230 is shown in FIG. 4, two or more devices may be connected to the hardware interface system 224 as shown, for example, with the example generic hardware interface system depicted in FIG. 2.

The example zipper system 232 includes a mechanical zipper 250 and a zipper controller 252 capable of at least determining status of the mechanical zipper. For example, the zipper controller 252 may determine movement or location of a slider 254 of the mechanical zipper 250 or whether a latch (not shown) for holding the slider 254 in a closed position is latched or unlatched. The zipper controller 252 may further be capable of causing the zipper system 232 to change state; for example, the zipper controller 252 may contain an actuator for moving the zipper latch between the latched and unlatched configurations.

The example electroluminescent panel 234 generates light when an appropriate power signal is applied thereto. A light detector such as the example light detector may be arranged to indicate to the hardware interface system 224 whether ambient light is present to allow the interface system 224 to control when the panel 234 is illuminated.

The example wireless sensor 236 may be a battery powered motion detector or the like. In the case of the backpack 220, the wireless sensor 236 formed by a motion detector may send data to the hardware interface system 224 indicating that the backpack 220 is moving. Alternatively, the example wireless sensor 236 may be a light detector for detecting when the inside of the backpack is dark.

The smartphone charger cable 238 is arranged to allow charging of the smartphone 240 in a conventional manner when required.

Optionally, a pocket assembly 260 may be provided to support the smartphone 240. The pocket assembly 260 may be integrally formed with the backpack 220, secured to the backpack 220 by stitching, or detachably attached to the backpack 220 snap fit, Velcro, or the like. The pocket assembly 260 may be a simple fabric pocket or may incorporate a sizing system and/or a wireless charging system as will be described in further detail below with reference to FIGS. 8-13, 14-17, 8-21, and/or 22-23.

The smartphone 240 is capable of communicating wirelessly with the hardware interface system 224. The smartphone 240 further will run a downloadable software backpack control application. The backpack control application running on the smartphone 240 may be or correspond to the application program 90 described above. In this case, the backpack control application may communicate through the connector 238 or may wirelessly communicate with the application programming interface of the software interface system running on the hardware interface device 224 as generally described above. The application will use a touchscreen 270, buttons 272, and speaker 274 of the smartphone 240 to allow the user of the backpack 220 to interface with the backpack control application.

The smartphone 240 running the backpack control application thus allows the user to control parameters of the hardware interface device 224 and allow the hardware device 224 to communicate alerts, alarms, and other status information to the user. For example, using the backpack control application, the user may set the parameters of the hardware interface system 224 such that the hardware interface system notifies the user, through the speaker 274, whenever the smartphone 240 is greater than a predetermined distance from the hardware interface system 224 and/or the wireless sensor 236 indicates that the backpack 220 is moving. As another example, the user may use the hardware interface system 224 to turn the electroluminescent panel 234 on and off remotely. As yet another example, the hardware interface system 224 may turn the electroluminescent panel 234 on when light is needed and off when light is not needed based on the settings of the zipper controller 252 and the wireless remote sensor 236.

IV. Third Specific Example

Figure 5:
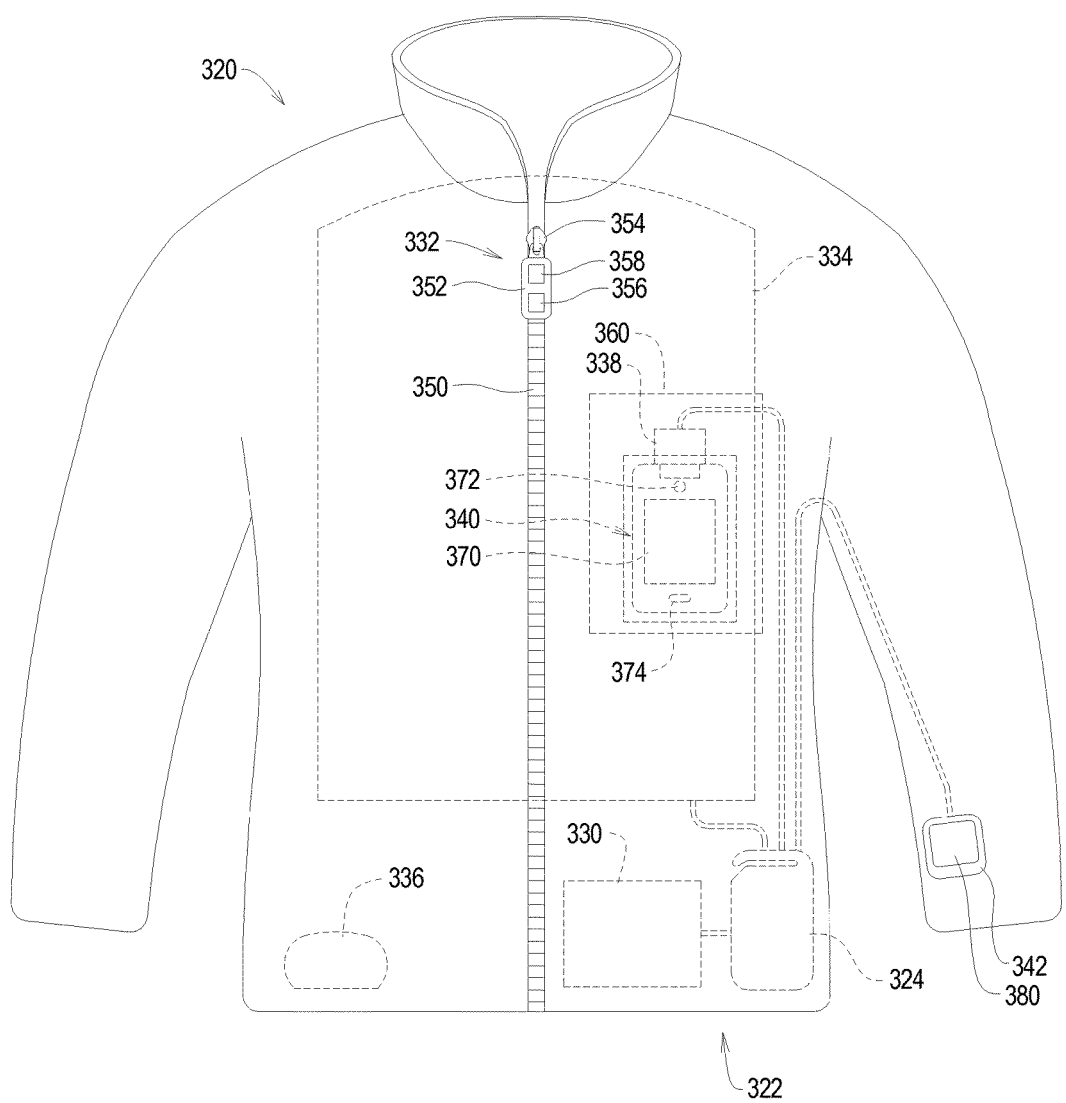
FIG. 5 is a front elevation view of an article of clothing such as a jacket or hooded sweatshirt illustrating the use of a third specific example interface system of the present invention.

Referring now to FIG. 5 of the drawing, depicted therein is a jacket 320 comprising a peripheral system 322 comprising a hardware interface system 324. The hardware interface system 324 may be, or incorporate, the generic hardware interface system 20 described above. The hardware interface system 324 may also implement the function of the example generic software interface system 22 described above. The example jacket 320 is or may be any conventional article of clothing and will not be described in further detail below.

The example peripheral system 322 further comprises an external power supply 330, a zipper system 332, a heating panel 334, a wireless sensor 336, and a phone charger 338. The example peripheral system 322 also further comprises a smartphone 340 and a wired user interface 342.

The example external power supply 330 is a battery, but other sources of electrical power may be employed. For example, the external power supply 330 may be or contain a device that converts kinetic energy of the jacket to electrical energy. Another alternative to a battery would be a solar power panel arranged to convert solar energy to electrical energy. Further, while only a single external power supply 330 is shown in FIG. 5, two or more devices may be connected to the hardware interface system 324 as shown, for example, with the example generic hardware interface system depicted in FIG. 1.

The example zipper system 332 includes a mechanical zipper 350 and a zipper controller 352 capable of at least determining status of the mechanical zipper. For example, the zipper controller 352 may determine movement or location of a slider 354 of the mechanical zipper 350 or whether a latch (not shown) for holding the slider 354 in a closed position is latched or unlatched. The zipper controller 352 may further be capable of causing the zipper system 332 to change state; for example, the zipper controller 352 may contain an actuator for moving the zipper latch between the latched and unlatched configurations. The example zipper controller 352 further comprises a button 356 and a light 358. The button 356 and light 358 form a user interface that allows, for example, the user to enter data that operates the zipper system 332 or other components of the peripheral system 322 such as the heating panel 334. If used to operate the heating panel 334, the user may press the button 356 to energize or de-energize the heating panel 334, with the light 358 lit to indicate that the heating panel 334 is energized.

The example heating panel 334 generates heat when an appropriate power signal is applied thereto.

The example wireless sensor 336 may be a battery powered motion detector or the like. In the case of the jacket 320, the wireless sensor 336 formed by a motion detector may send data to the hardware interface system 324 indicating that the jacket 320 is moving. Alternatively, the example wireless sensor 336 may be a temperature sensor for generating a temperature signal corresponding to the temperature inside the jacket 320.

The smartphone charger cable 338 is arranged to allow charging of the smartphone 340 in a conventional manner when required.

Optionally, a pocket assembly 360 may be provided to support the smartphone 340. The pocket assembly 360 may be integrally formed with the jacket 320, secured to the jacket 320 by stitching, or detachably attached to the jacket 320 snap fit, Velcro, or the like. The pocket assembly 360 may be a simple fabric pocket or may incorporate a sizing system and/or a wireless charging system as will be described in further detail below with reference to FIGS. 8-13, 14-17, 18-21, and/or 22-23.

The smartphone 340 is capable of communicating wirelessly with the hardware interface system 324. The smartphone 340 further will run a downloadable software jacket control application. The jacket control application running on the smartphone 340 may be or correspond to the application program 90 described above. In this case, the jacket control application will wirelessly communicate with the application programming interface of the software interface system running on the hardware interface device 324 as generally described above. The application will use a touchscreen 370, buttons 372, and speaker 374 of the smartphone 340 to allow the user of the jacket 320 to interface with the jacket control application.

The smartphone 340 running the jacket control application thus allows the user to control parameters of the hardware interface device 324 and allow the hardware device 324 to communicate alerts, alarms, and other status information to the user. For example, using the jacket control application, the user may set the parameters of the hardware interface system 324 such that the hardware interface system notifies the user, through the speaker 374, whenever the smartphone 340 is greater than a predetermined distance from the hardware interface system 324 and/or the wireless sensor 336 indicates that the jacket 320 is moving. As another example, the user may use the hardware interface system 324 to turn the heating panel 334 on and off remotely. As yet another example, the hardware interface system 324 may turn the heating panel 334 on and off based on a temperature signal and/or battery capacity to control the heat within the jacket 320 and/or conserve or extend battery life.

The example wired user interface 342 is located adjacent to the wrist for ease of access. The example wired user interface 342 contains a touch screen 380 that allows the user to send instructions and data to the hardware interface device 324 and the hardware interface device 324 to send prompts and status information to the user. The user may thus use the example wired user interface 342 to control any element of the peripheral system 322 by lifting one hand to the other wrist. For example, the user may use the wired user interface 342 to latch and unlatch the zipper system 332, turn on and of the heating panel 334, and/or control a phone or music player of the smartphone 340.

V. Fourth Specific Example

Figure 6:
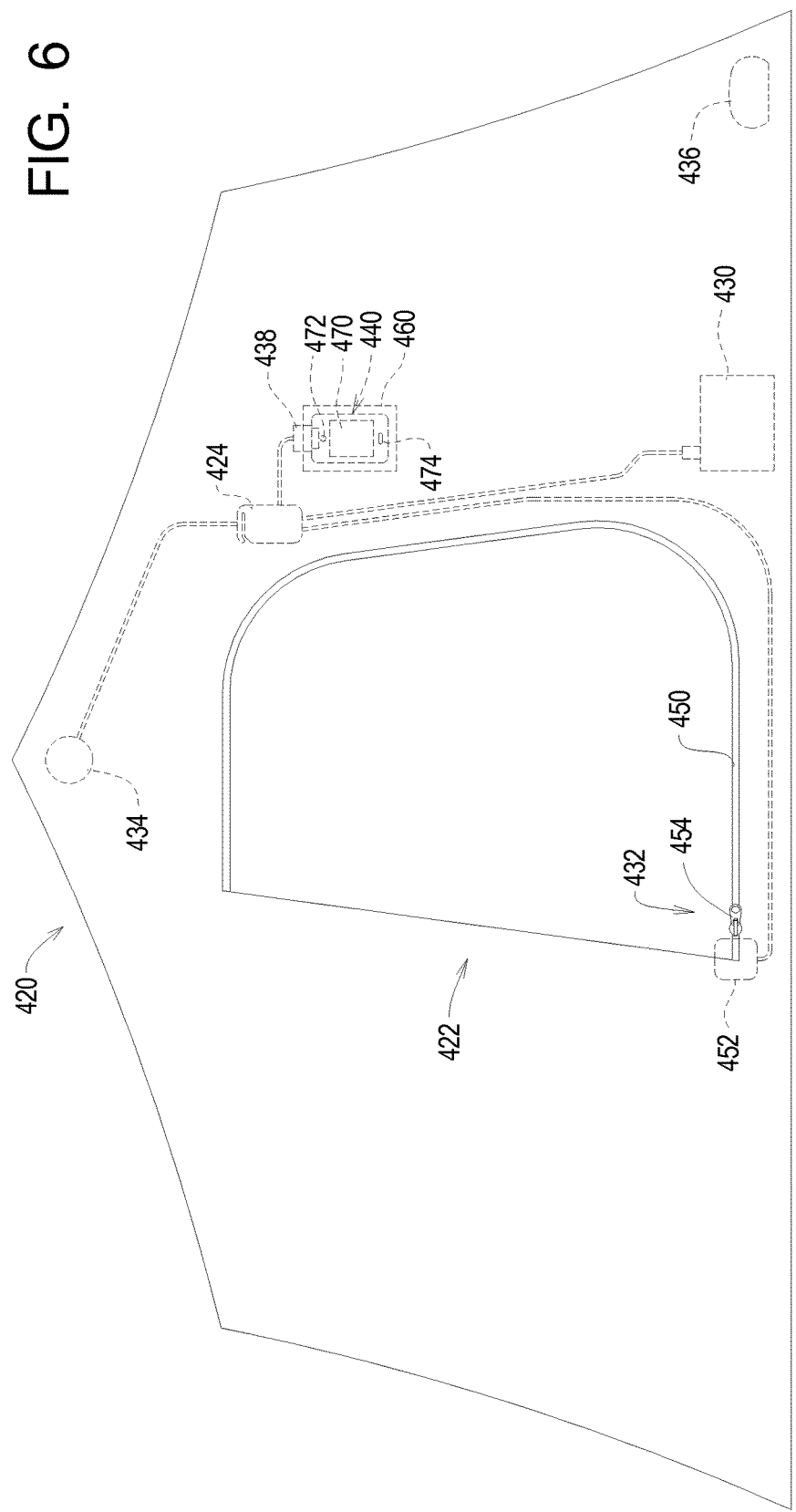
FIG. 6 is a front elevation, somewhat schematic view of a tent illustrating the use of a fourth specific example interface system of the present invention.

Referring now to FIG. 6 of the drawing, depicted therein is a tent 420 comprising a peripheral system 422 comprising a hardware interface system 424. The hardware interface system 424 may be, or incorporate, the generic hardware interface system 20 described above. The hardware interface system 424 may also implement the function of the example generic software interface system 42 described above. The example tent 420 is or may be any conventional camping structure and will not be described in further detail below.

The example peripheral system 422 further comprises an external power supply 430, a zipper system 432, a light 434, a wireless sensor 436, and a phone charger 438. The example peripheral system 422 also further comprises a smartphone 440.

The example external power supply 430 is a battery, but other sources of electrical power may be employed. For example, the external power supply 430 may be or contain a device that converts kinetic energy of the tent to electrical energy. Another alternative to a battery would be a solar power panel arranged to convert solar energy to electrical energy. Further, while only a single external power supply 430 is shown in FIG. 6, two or more devices may be connected to the hardware interface system 424 as shown, for example, with the example generic hardware interface system depicted in FIG. 1.

The example zipper system 432 includes a mechanical zipper 450 and a zipper controller 452 capable of at least determining status of the mechanical zipper. For example, the zipper controller 452 may determine movement or location of a slider 454 of the mechanical zipper 450 or whether a latch (not shown) for holding the slider 454 in a closed position is latched or unlatched. The zipper controller 452 may further be capable of causing the zipper system 432 to change state; for example, the zipper controller 452 may contain an actuator for moving the zipper latch between the latched and unlatched configurations.

The example light 434 generates light when an appropriate power signal is applied thereto.

The example wireless sensor 436 may be a battery powered motion detector or the like. In the case of the tent 420, the wireless sensor 436 formed by a motion detector may sending a movement signal to the hardware interface system 424 indicating that there is movement within the tent 420. Alternatively, the example wireless sensor 436 may be a temperature sensor for generating a temperature signal corresponding to the temperature inside the tent 420.

The smartphone charger cable 438 is arranged to allow charging of the smartphone 440 in a conventional manner when required.

Optionally, a pocket assembly 460 may be provided to support the smartphone 240. The pocket assembly 460 may be integrally formed with the tent 420, secured to the tent 420 by stitching, or detachably attached to the tent 420 snap fit, Velcro, or the like. The pocket assembly 460 may be a simple fabric pocket or may incorporate a sizing system and/or a wireless charging system as will be described in further detail below with reference to FIGS. 8-13, 14-17, 18-21, and/or 22-23.

When used with a tent such as the example tent 420, the peripheral system 422 may also comprise or be adapted to be connected to a solar panel supported by or forming a part of the tent 420. Such a solar panel would be incorporated into the peripheral system 422 in a manner similar to that of the solar panel 60*b* described above to charge the battery 430 and/or directly provide power to the peripherals 432 and 434 and/or the smartphone 440. In this case, a power DC-DC converter may be incorporated into or connected to the peripheral system 422. A converter incorporated into the peripheral system 422 may be incorporated into the hardware interface system 424.

With the example peripheral system 422, the smartphone 440 may be used as a controller for any of the peripherals forming a part of the peripheral system 422. For example, the smartphone 440 may be used as a controller for the light 434, through a wired or wireless communication link to the hardware interface system 424. In addition or instead, a photo-sensor may be used as part of the peripheral system 422 to regulate lighting within the tent according to a user selected lighting profile. For example, if there was adequate sun light the hardware would turn the interior lighting off but as the sun went down the hardware could automatically detect this and turn on the interior tent lights. Also, to conserve power the tent lighting could be automatically turned off if the user walked away from the hardware interface system 424 while carrying the phone 440.

The smartphone 440 is capable of communicating wirelessly with the hardware interface system 424. The smartphone 440 further will run a downloadable software tent control application. The tent control application running on the smartphone 440 may be or correspond to the application program 90 described above. In this case, the tent control application will wirelessly communicate with the application programming interface of the software interface system running on the hardware interface device 424 as generally described above. The application will use a touchscreen 470, buttons 472, and speaker 474 of the smartphone 440 to allow the user of the tent 420 to interface with the tent control application.

The smartphone 440 running the tent control application thus allows the user to control parameters of the hardware interface device 424 and allow the hardware device 424 to communicate alerts, alarms, and other status information to the user. For example, using the tent control application, the user may set the parameters of the hardware interface system 424 such that the hardware interface system notifies the user, through the speaker 474, whenever the smartphone 440 is greater than a predetermined distance from the hardware interface system 424 and/or the wireless sensor 436 indicates that the tent 420 is moving. As another example, the user may use the hardware interface system 424 to turn the light 434 on and off remotely. As yet another example, the hardware interface system 424 may turn the light 434 on and off based on a movement signal and/or battery capacity to control the heat within the tent 420 and/or conserve or extend battery life.

VI. Fifth Specific Example

Figure 7:
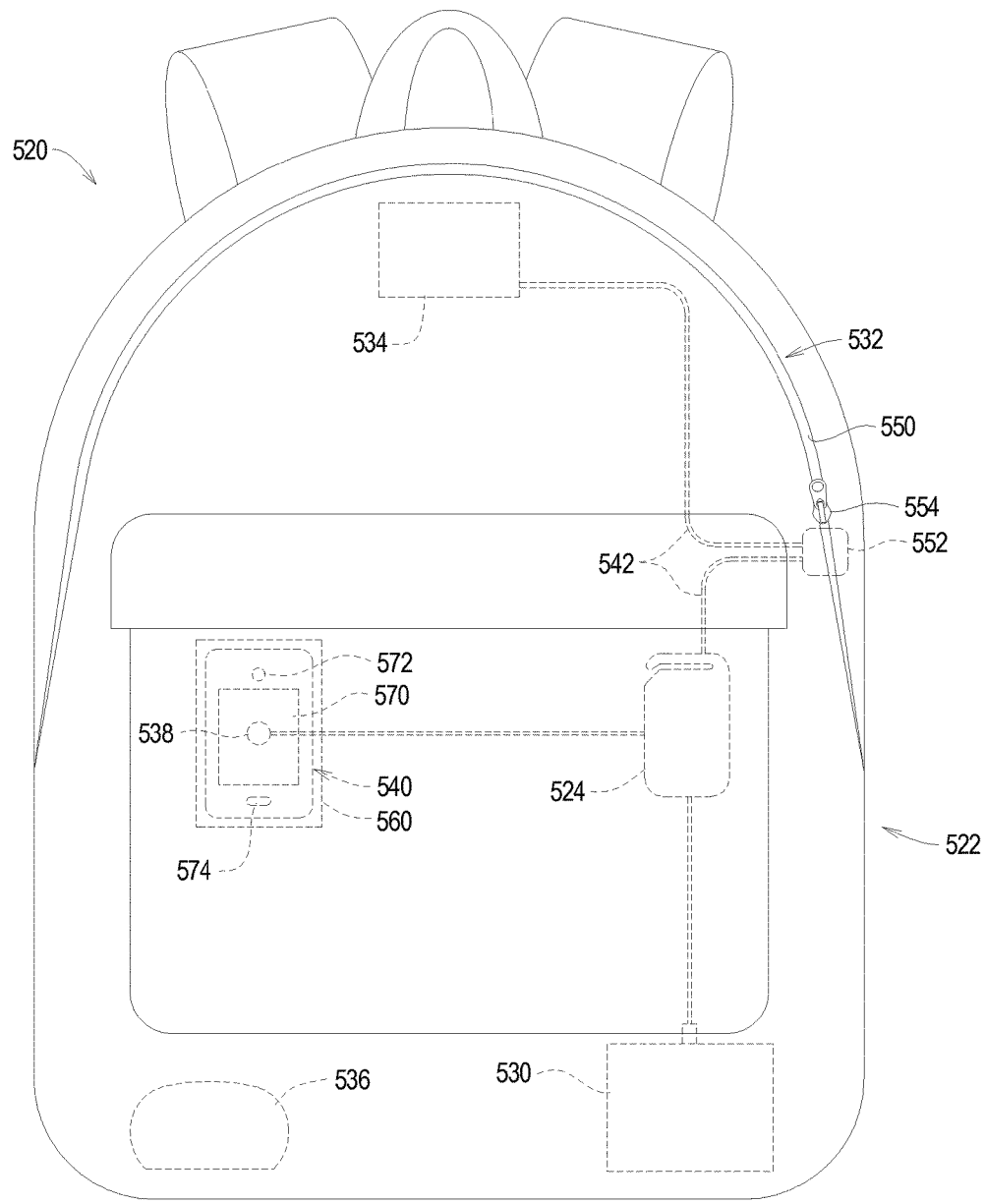
FIG. 7 is a front elevation view of a backpack illustrating the use of a fifth specific example interface system of the present invention.

Referring now to FIG. 7 of the drawing, depicted therein is a backpack 520 comprising a peripheral system 522 comprising a hardware interface system 524. The hardware interface system 524 may be, or incorporate, the generic hardware interface system 20 described above. The hardware interface system 524 may also implement the function of the example generic software interface system 22 described above. The example backpack 520 is or may be conventional and will not be described in further detail below.

The example peripheral system 522 further comprises an external power supply 530, a zipper system 532, an electroluminescent panel 534, a wireless sensor 536, and a phone charger 538. The example peripheral system 522 may also further comprise a smartphone 540. The example peripheral system 522 further comprises a cable 542 that extends from the hardware interface system 524 to the zipper controller 552 and then to the light panel 534. The cable 542 may be a bundle of electrical connectors each extending from the hardware interface system 524 to one of the zipper controller 552 and the light panel 534.

Alternatively, the cable 542 may be a combination of power and data cables that allows power selectively to be supplied to one or both of the zipper controller 552 and light panel 534 and data to be transmitted between the hardware interface system 524 and one or both of the zipper controller 552 and light panel 534. For example, a Universal Serial Bus (USB) or variant thereof, with or without associated USB connectors, may be used to connect the hardware interface system 524, the zipper controller 552, and light panel 534 such that the hardware interface system 524 can selectively supply power to the controller 552 and panel 534 and/or transmit data to and/or receive data from the controller 552 and panel 534. The use of the example cable 542 can simplify the construction of the hardware interface system 524 and assembly of the backpack 520 in comparison to the use of separate cables extending from the hardware interface system 524 to each of the controller 552 and panel 534. If a bus capable of supplying power and data (e.g., USB) is used, a separate cable extending between the hardware interface system 524 and the smartphone 540 may be omitted in favor of a single cable that also extends to the smartphone power connector.

The exact number and type of peripherals (e.g., zipper system 532, electroluminescent panel 534, and wireless sensor 536) may vary depending on the nature of a particular system. For example, although the example peripheral system 522 comprises an electroluminescent panel, other types of displays, such as LCD, LED, OLED, or the like may be used in addition or instead.

The example external power supply 530 is a battery, but other sources of electrical power may be employed. For example, if the backpack 520 has wheels, the wheels may be connected to a generator that forms a power supply. If the backpack 520 is often moved or shaken, the external power supply 530 may be or contain a device that converts kinetic energy of the backpack to electrical energy. Another alternative to a battery would be a solar power panel arranged to convert solar energy to electrical energy. Further, while only a single external power supply 530 is shown in FIG. 7, two or more devices may be connected to the hardware interface system 524 as shown, for example, with the example generic hardware interface system depicted in FIG. 1.

The example zipper system 532 includes a mechanical zipper 550 and a zipper controller 552 capable of at least determining status of the mechanical zipper. For example, the zipper controller 552 may determine movement or location of a slider 554 of the mechanical zipper 550 or whether a latch (not shown) for holding the slider 554 in a closed position is latched or unlatched. The zipper controller 552 may further be capable of causing the zipper system 532 to change state; for example, the zipper controller 552 may contain an actuator for moving the zipper latch between the latched and unlatched configurations.

The example electroluminescent panel 534 generates light when an appropriate power signal is applied thereto. A light detector such as the example light detector may be arranged to indicate to the hardware interface system 524 whether ambient light is present to allow the interface system 524 to control when the panel 534 is illuminated.

The example wireless sensor 536 may be a battery powered motion detector or the like. In the case of the backpack 520, the wireless sensor 536 formed by a motion detector may send data to the hardware interface system 524 indicating that the backpack 520 is moving. Alternatively, the example wireless sensor 536 may be a light detector for detecting when the inside of the backpack is dark.

The smartphone charger cable 538 is arranged to allow charging of the smartphone 540 in a conventional manner when required.

The example backpack 520 comprises a pocket assembly 560 to support the smartphone 540. The pocket assembly 560 may be integrally formed with the backpack 520, secured to the backpack 520 by stitching, or detachably attached to the backpack 520 snap fit, Velcro, or the like. The example pocket assembly 560 incorporates a sizing system and/or a wireless charging system as will be described in further detail below with reference to FIGS. 8-13, 14-17, 18-21, and/or 52-23.

The smartphone 540 is capable of communicating wirelessly with the hardware interface system 524. The smartphone 540 further will run a downloadable software backpack control application. The backpack control application running on the smartphone 540 may be or correspond to the application program 90 described above. In this case, the backpack control application may communicate through the connector 538 or may wirelessly communicate with the application programming interface of the software interface system running on the hardware interface device 524 as generally described above. The application will use a touchscreen 570, buttons 572, and speaker 574 of the smartphone 540 to allow the user of the backpack 520 to interface with the backpack control application.

The smartphone 540 running the backpack control application thus allows the user to control parameters of the hardware interface device 524 and allow the hardware device 524 to communicate alerts, alarms, and other status information to the user. For example, using the backpack control application, the user may set the parameters of the hardware interface system 524 such that the hardware interface system notifies the user, through the speaker 574, whenever the smartphone 540 is greater than a predetermined distance from the hardware interface system 524 and/or the wireless sensor 536 indicates that the backpack 520 is moving. As another example, the user may use the hardware interface system 524 to turn the electroluminescent panel 534 on and off remotely. As yet another example, the hardware interface system 524 may turn the electroluminescent panel 534 on when light is needed and off when light is not needed based on the settings of the zipper controller 552 and the wireless remote sensor 536.

VII. First Example Pocket Assembly

Referring now to FIGS. 8-13, a first example pocket assembly 620 of the present invention will be described. As perhaps best shown in FIG. 10, the first example pocket assembly 620 comprises an envelope member 622, a transmitter antenna 624, and an adjusting system 626.

The example envelope member 622 is sized and dimensioned to accommodate smartphones of various sizes and defines a bottom panel 630, front and rear panels 632a and 632b, first and second side panels 634a and 634b, an interior chamber 636, and a top opening 638.

The example transmitter antenna 624 is secured to the rear panel 632b of the envelope member 622. The transmitter antenna 624 is electrically connected to a power source such as any one of the hardware interface systems 124, 224, 324, 424, and 524 described above. When energized, the transmitter antenna 624 generates an electromagnetic signal capable of transmitting power to a receiving antenna as will be described in further detail below. For the purposes of this discussion, the first example pocket assembly 620 will be described as part of the example peripheral system 522 supported by the backpack 520, and certain elements of the first example pocket assembly 620 are also identified in FIG. 7.

The example adjusting system 624 comprises a base portion 640, a front portion 642, a rear portion 644, a first side portion 646, and a second side portion 648. The transmitter antenna 624 may optionally be secured to the rear portion 644 of the adjusting system 624. The example base portion 640 is a flat plate. The example front portion 642 and the rear portion 644 are inwardly curved towards each other, and the first side portion 646 and the second side portion 648 are inwardly curved toward each other. At least the portions 642, 644, 646, and 648 are made of resiliently deformable material such that the example front portion 642 resiliently opposes the example rear portion 644 and the example first side portion 646 resiliently opposes the example second side portion 648. The example portions 642, 644, 646, and 648 each define a proximal portion 642a, 644a, 646a, and 648a and a distal portion 642b, 644b, 646b, and 648b. The proximal portions 642a and 644a are closer together than the distal portions 642b and 644b, and the proximal portions 646a and 648a are closer together than the distal portions 646b and 648b.

The example adjusting system 624 is arranged within the interior chamber 636 such that the base portion 640 is supported by the bottom panel 630, the front portion 642 is adjacent to the front panel 632a, the rear portion 644 is adjacent to the rear panel 632b, the first side portion 646 is adjacent to the first side panel 634a, and the second side portion 648 is adjacent to the second side panel 634b. Adhesive, stitching, or other means may be used to secure the adjusting system 626 within the interior chamber 636. The envelope member 622 is then secured to the backpack 520 at an appropriate location, and the top opening 638 is accessed through a slit or narrow opening (not shown) in the backpack 520. Typically, the pocket assembly 620 is completely hidden except for what is visible through the slit or narrow opening.

In use, a smartphone 650a or 650b is inserted into the top opening 638 such that a front surface 660 of the smartphone engages the front portion 642, a rear surface 662 of the smartphone engages the rear portion 644, a first side surface 664 of the smartphone 650 engages the first side portion 646, and a second side surface 666 of the smartphone 650 engages the second side portion 648. In particular, the smartphone initially engages the distal portions 642b, 644b, 646b, and 648b and deforms the portions 642, 644, 646, and 648 until the smartphone eventually engages the proximal portions 642a, 644a, 646a, and 648a.

The proximal portions 642a, 644a, 646a, and 648a substantially center the smartphone within the interior chamber 636 so long as the size and dimensions of the smartphone 650 fall within a predetermined range. FIGS. 10 and 11 illustrate the relatively small smartphone 650a held within the interior chamber 636, and FIGS. 12 and 13 illustrate the relatively large smartphone 650b held within the interior chamber 636.

FIGS. 10 and 12 illustrate that the example smartphones 660a and 660b each define a receiving antenna 670a and 670b, respectively, and that the adjusting system 626 substantially aligns either of the receiving antennas 670a and 670b with the transmitting antenna 624. The adjusting system 626 will further hold the receiving antennas in close proximity to the transmitting antenna 624.

VIII. Second Example Pocket Assembly

Referring now to FIGS. 14-17, a second example pocket assembly 720 of the present invention will be described. The second example pocket assembly 720 comprises an envelope member 722, a transmitter antenna 724, and an adjusting system 726.

The example envelope member 722 is sized and dimensioned to accommodate smartphones of various sizes and defines a bottom panel 730, front and rear panels 732a and 732b, first and second side panels 734a and 734b, an interior chamber 736, and a top opening 738.

The example transmitter antenna 724 is secured to the rear panel 732b of the envelope member 722. The transmitter antenna 724 is electrically connected to a power source such as any one of the hardware interface systems 124, 224, 324, 424, and 524 described above. When energized, the transmitter antenna 724 generates an electromagnetic signal capable of transmitting power to a receiving antenna as will be described in further detail below.

The example adjusting system 726 comprises first and second elastic bands 740 and 742. The first and second elastic bands 740 and 742 are arranged at first and second spaced locations between the bottom panel 730 and the top opening 738.

The envelope member 722 is secured to the bag 120, backpack 220, jacket 320, tent 420, or backpack 520 at an appropriate location. For certain structures, the top opening 738 is accessed through a slit or narrow opening (not shown) in the structure. The pocket assembly 720 is typically completely hidden except for what is visible through the slit or narrow opening.

In use, a smartphone 750a or 750b is inserted into the top opening 738 such that smartphone extends through the first and second elastic bands 740 and 742. The elastic band 740 and 742 are deformable such that they expand to snugly receive either the relatively small phone 750a or the relatively large phone 750b.

FIGS. 14 and 16 illustrate that the example smartphones 750a and 750b each define a receiving antenna 762a and 762b, respectively, and that the adjusting system 726 substantially aligns either of the receiving antennas 762a and 762b with the transmitting antenna 724. The adjusting system 726 will further hold the receiving antennas in close proximity to the transmitting antenna 724.

IX. Third Example Pocket Assembly

Referring now to FIGS. 18-21, a third example pocket assembly 820 of the present invention will be described. The third example pocket assembly 820 comprises an envelope member 822 and a transmitter antenna 824. The material from which the envelope member 822 is resiliently flexible such that the envelope member 822 forms an adjusting system 826.

The example envelope member 822 is sized and dimensioned to accommodate smartphones of various sizes and defines a bottom panel 830, front and rear panels 832a and 832b, first and second side panels 834a and 834b, an interior chamber 836, and a top opening 838.

The example transmitter antenna 824 is secured to the rear panel 832b of the envelope member 822. The transmitter antenna 824 is electrically connected to a power source such as any one of the hardware interface systems 124, 224, 324, 424, and 524 described above. When energized, the transmitter antenna 824 generates an electromagnetic signal capable of transmitting power to a receiving antenna as will be described in further detail below.

The envelope member 822 is secured to the bag 120, backpack 220, jacket 320, tent 420, or backpack 520 at an appropriate location. For certain structures, the top opening 838 is accessed through a slit or narrow opening (not shown) in the structure. The pocket assembly 820 is typically completely hidden except for what is visible through the slit or narrow opening.

In use, a smartphone 850a or 850b is inserted into the top opening 838 such that smartphone expands the material forming the envelope member 822 such that the envelop member 822 expands to snugly receive either the relatively small phone 850a or the relatively large phone 850b.

FIGS. 10 and 12 illustrate that the example smartphones 850a and 850b each define a receiving antenna 862a and 862b, respectively, and that the adjusting system 826 substantially aligns either of the receiving antennas 862a and 862b with the transmitting antenna 824. The adjusting system 826 will further hold the receiving antennas in close proximity to the transmitting antenna 824.

X. Fourth Example Pocket Assembly

Referring now to FIGS. 22 and 23, a fourth example pocket assembly 920 of the present invention will be described. The fourth example pocket assembly 920 comprises an envelope member 922 and a transmitter antenna system 924. Like the third example pocket assembly 820 described above, the material from which the envelope member 922 is resiliently flexible such that the envelope member 922 forms an adjusting system 926. However, the principles of the fourth example pocket assembly 920 may be implemented using the adjusting systems of the first and second example pocket assemblies 620 and 720 described above.

The example envelope member 922 is sized and dimensioned to accommodate smartphones of various sizes and defines a bottom panel 930, front and rear panels 932a and 932b, first and second side panels 934a and 934b, an interior chamber 936, and a top opening 938.

The example transmitter antenna system 924 comprises first, second, and third transmitter antennas 940, 942, and 944 that are secured to the rear panel 932b of the envelope member 922. The transmitter antennas 940, 942, and 944 are electrically connected to a power source such as any one of the hardware interface systems 124, 224, 324, 424, and 524 described above. When energized, the transmitter antennas 940, 942, and 944 generate electromagnetic signals capable of transmitting power to a receiving antenna as will be described in further detail below.

The envelope member 922 is secured to the bag 120, backpack 220, jacket 320, tent 420, or backpack 620 at an appropriate location. For certain structures, the top opening 938 is accessed through a slit or narrow opening (not shown) in the structure. The pocket assembly 920 is typically completely hidden except for what is visible through the slit or narrow opening.

In use, a smartphone 950a or 950b is inserted into the top opening 938 such that smartphone expands the material forming the envelope member 922 such that the envelop member 922 expands to snugly receive either the relatively small phone 950a or the relatively large phone 950b.

FIGS. 10 and 12 illustrate that the example smartphones 960a and 960b each define a receiving antenna 962a and 962b, respectively, and that the adjusting system 926 substantially aligns either of the receiving antennas 962a and 962b with one or more of the transmitting antennas 940, 942, and/or 944. The adjusting system 926 will further hold the receiving antennas in close proximity to the transmitting antennas 940, 942, and 944.

XI. Example Hardware Interface System

Referring now to FIG. 24 of the drawing, depicted therein is an example hardware interface system 1020 of the present invention. The example hardware interface system comprises a housing 1030 defining first and second hook projections 1032 and 1034 defining a hook slot 1036 and a hook opening 1038. A strap or the like (not shown in FIG. 24) may be slid through the hook slot and twisted into the hook opening 1038 such that the housing 1030 is securely and detachably supported by the strap.

The example housing 1030 also supports a display 1040 and defines a slider control 1042 and a selection control 1044. The display 1040 displays information under control of a hardware interface software system running on the hardware interface system 1020. The slider control 1042 is a touch sensor button that allows the user to change screens displayed on the display 1040 with a finger swipe. The selection control 1044 is a touch sensor button that allows the user to select options, functions, etc. displayed by the display 1040.

Extending from the housing 1030 are first and second cables 1050 and 1052. The first cable 1050 connects the hardware interface system 1020 to a battery (not visible in FIG. 24). The second cable 1052 connects the hardware interface system 1020 to peripherals, smartphones, etc. as described herein and transmits power to and transmits and receives commands and data with the peripherals, smartphones, etc. Formed in the example housing 1030 are first and second connector ports 1054 and 1056 that may be used to connect cables (not shown in FIG. 24) for transferring power, data, and commands to external devices such as portable electronic devices (e.g., smartphones), power supplies, utility power outlets, chargers, solar panels, and the like.

XII. Additional Variations and Features

A. Inbound Power/Managing Generated Power

The hardware interface system 20 and software interface system 22 described above may be configured to manage power generated from external sources. For example, a DC-DC converter may receive power from a solar panel supported by a movable structure incorporating the principles of the present invention and store that power in a battery for use as generally described above. An AC-DC converter may receive power from the wheels of a rolling carry-on bag. As yet another alternative, the interface systems 20 and 22 could further manage and distribute power from kinetic power generation (e.g., "shake for power") products; such kinetic power generators generate power when a backpack is carried, from the user's movement.

B. Electromechanical Fabric

The use of electromechanical fabric is desired by bag makers to allow the bags to be shaped and by garment makers to allow clothing to be shaped. The hardware interface system 20 and software interface system 22 described above may be configured to utilize Electromechanical Fabric control, yielding a sensor sensing something most likely about the person or environment.

Smart fabrics are wearable, weaveable, and stretchable and include sensing/response capability, which is frequently based on electrical measurement. For example, a single-walled carbon nanotube coated cotton yarn (SWNT-CY) exhibits negative piezoresistance due to mechanical contact between fabric fibers, which leads to better electrical paths of SWNT networks. The gauge factor (the ratio of the normalized change in piezoresistance to the change in strain) of SWNT-CY is measured to be—24, which is negative and an order of magnitude higher than that for conventional metal strain gauges. The effective barrier strength of strained SWNT-CY is measured to be ~30% lower than that of unstrained SWNT-CY. This characteristic may offer new design opportunities for wearable electronics and has significant implications for sensor applications and can be incorporated by the example hardware interface system 20 and/or example software interface system 22.

This feature may be used, for example, with women's bags and garments. Women's handbags often have a slouchy/hammock shape for fashion reasons, they would like them to straighten and hold a more rigid shape when the woman wants to open them and find things, then relax again when she's carrying it for a stylish look. Daypack and business bag makers would like the opposite, they want the bags to relax when being loaded with files, laptops, etc., but then draw up tight into clean shapes when being carried. Currently, most daypacks look like bean bag chairs with shoulder straps. They want them to be more sculpted and sleek when carried. Electromechanical fabric would draw the bag up tight, sharpening the appearance of the bag when full and making the center of gravity closer to the person carrying the bag for easier carrying. Garment makers want to make electromechanical clothing, both next to skin garments and things like dresses, as well as outerwear (like rain jackets), they would like them to relax for the user to don the garment then draw up close to create a flattering, less baggy shape.

C. Sensors

The hardware interface system 20 and software interface system 22 described above may be configured to utilize sensors, such as those implemented using the smart fabrics described above. For example a rain jacket that increases it's waterproofness when it's raining (fabric weave tightens), but becomes more breathable when dry (not raining) because the fabric weave relaxes. Alternatively, a runner's light daypack or waist pack may sense the runners physical state during the run. Bio sensing sensors, human skin sensors or the like can be incorporated into the systems 20 and 22. Sensors to determine whether the bag pockets are open, if the bag is moving, if the bag got dropped violently, to indicate whether handles are retracted (or to retract handles), whether zippers are hidden (or to hide zippers), whether buckles are exposed (or to withdraw or emerge buckles) may be used. The example hardware interface system 20 and/or example software interface system 22 provide reliable power, power management, and wireless transmission of the data to sensors of various types.

D. Electrical Heating or Cooling of Bags

The hardware interface system 20 and software interface system 22 described above may be configured to support the electrical heating or cooling of bags, garments, equipment. The heating of tents and sleeping pads would be desirable. Alternatively, the cooling the interiors of handbags and other bags to protect electronics and food and women's makeup would be a feature that may be controlled by the example hardware interface system 20 and/or example software interface system 22.

E. Local Communications

The example hardware interface system 20 and/or example software interface system 22 can be configured to provide communication "assistance" by forming a mobile hotspot and/or enhancing wireless transmission.

F. Onboard Computing or Memory

The example hardware interface system 20 and/or example software interface system 22 can be configured to allow onboard computing and/or memory to be built into bags. For example, an entire smartphone can be built into the bag, with perhaps a watch and/or earpiece being used as the interface for the smartphone. In this case, a relatively screen may be formed on the side of the bag, under a flap of the bag, or the like.

G. Smartphone or Tablet Application

As discussed above, The example hardware interface system 20 and/or example software interface system 22 can be configured to communicate with a smartphone app to allow even more sophisticated control, such as programming (customization of feature behavior) or data transfer (as with biometric data or sensor data from a runner's pack or similar).

H. Software Functions

Core Functions: Zippers
 1. Pair to phone
 2. Confirm zipper at closed end stop
 3. Confirm zipper not at closed end stop
 4. Actual Zipper Location
 5. Open lock on zipper pull
 6. Close lock on zipper pull
 7. Open lock on zipper tape
 8. Close lock on zipper tape
 9. Zipper Biometric Information
 10. Lock Zipper if phone is more than _____ feet away
 11. Zipper unlock after X period
 12. Zipper unlock at X time of day
 13. Zipper lock during X times of day Core Functions: Electroluminescent panel
 1. Pair to phone
 2. Panel off
 3. Panel on at brightness setting
   a. 25%, 50%, 75%, 100%
 4. Panel on at custom brightness setting
 5. Panel blinking at rate
   a. 0.5 second
   b. 1 second
   c. 2 seconds
 6. Panel color settings
   a. Color setting 1
   b. Color setting 2
   c. Color setting 3
 7. Panel on for X Period
   a. 30 min
   b. 60 min
 8. Panel off after x time of day Crossover Function: Alarm Settings
 1. Pair to phone
 2. Turn alarm on
 3. Turn alarm on for _____ period
 4. Notify phone if (bag) is more than _____ feet away
   a. With vibration
   b. With a sound
 5. Make sound (in bag) if phone is more than _____ feet away
   a. Lock zippers on bag if phone is more than _____ feet away
   b. Flash EL Panel at 100% every 0.25 seconds if bag is more than _____ feet away
 6. Turn off alarm after _____ time of day
 7. Always turn on alarm during these periods of the day (e.g. subway commute)

What is claimed is:

1. An interface system for an application and a portable structure comprising at least one power supply, at least one wired functional device forming a part of the portable structure, where the interface system is operatively connected to at the least one power supply, the at least one wired functional device, and at least one wireless functional device and the application comprises at least one of commands and data for controlling the at least one power supply, the at least one wired functional device, and the at least one wireless functional device, the interface system comprising:
 a hardware interface comprising
  a power interface operatively connected to the at least one power supply;
  a wired interface operatively connected to the at least one wired functional device;
  a wireless interface wirelessly connected to the at least one wireless functional device; and
 a controller operatively connected to the power interface, the wired interface, and the wireless interface; whereby
 the controller runs a software interface system defining an application programming interface in communication with the application and a peripheral programming interface in communication with the power interface, the wired interface, and the wireless interface;
 the application communicates with the power interface through the software interface system to control distribution of power from the at least one power supply to the at least one wired functional device;
 the application communicates with the wired interface through the software interface system to distribute at least one of commands and data with the wired functional device; and
 the application communicates with the wireless interface through the software interface system to distribute at least one of commands and data with the wireless functional device.

2. An interface system as recited in claim 1, in which the software interface system comprises a software interface system that coordinates the transfer of at least one of commands and data between the application programming interface and the peripheral programming interface.

3. An interface system as recited in claim 1, in which the software interface system comprises at least one driver operatively connected between the peripheral programming interface and at least one of the power interface, the wired interface, and the wireless interface.

4. An interface system as recited in claim 1, in which:
 the wireless functional device communicates with the hardware interface system to control at least one parameter stored by the hardware interface; and
 the hardware interface system communicates status information associated with the portable structure to the user based on the at least one parameter stored by the hardware interface system.

5. An interface system as recited in claim 1, in which:
 the at least one parameter is a distance parameter that corresponds to a predetermined distance; and
 the hardware interface system notifies the user when a distance between the hardware interface system and the wireless functional device exceeds the predetermined distance.

6. An interface system as recited in claim 1, in which:
the at least one parameter is a movement parameter that corresponds to a movement status of the hardware interface system; and
based on the movement parameter, the hardware interface system notifies the user when the hardware interface system is moving.

7. An interface system as recited in claim 1, in which:
the at least one parameter is a device parameter that corresponds to a status of at least one wired functional device connected to the hardware interface system; and
based on the device parameter, the hardware interface system notifies the user when the status of the at least one wired functional device changes.

8. An interface system as recited in claim 1, in which the portable structure is adapted to be carried by a user.

9. An interface system as recited in claim 1, in which the portable structure is selected from a group consisting of an article of clothing, a bag, a backpack, and a tent.

10. An interface system as recited in claim 1, in which the wired functional device is at least one of a zipper, a zipper controller, a buckle, a light, a flap, an electroluminescent panel, a user interface, a power supply, a light detector, and a wireless charger.

11. An interface system as recited in claim 1, in which the wireless functional device is at least one of a sensor, a smartphone, or a tablet computer.

12. An interface system as recited in claim 1, in which:
the portable structure is adapted to be carried by a user;
the wired functional device is at least one of a zipper, a zipper controller, a buckle, a light, a flap, an electroluminescent panel, a user interface, a power supply, a light detector, and a wireless charger; and
the wireless functional device is at least one of a sensor and a smartphone.

13. An interface system as recited in claim 12, in which the portable structure is selected from a group consisting of an article of clothing, a bag, a backpack, and a tent.

14. An interface system as recited in claim 1, in which the application programming interface defines at least one function for at least one wired functional device, where the application program controls the at least one wired functional device using the at least one function.

15. An interface system as recited in claim 1, in which the application programming interface defines a plurality of functions for each wired functional device, where the application program controls the at least one wired functional device using the plurality of functions.

16. An interface system as recited in claim 1, in which the application programming interface defines at least one function for at least one wireless functional device, where the application program controls the at least one wireless functional device using the at least one function.

17. An interface system as recited in claim 1, in which the application programming interface defines a plurality of functions for each wireless functional device, where the application program controls the at least one wireless functional device using the plurality of functions.

18. An interface system as recited in claim 1, in which the application programming interface defines:
at least one wired function for at least one wired functional device, where the application program controls the at least one wired functional device using the at least one wired function; and
at least one wireless function for at least one wireless functional device, where the application program controls the at least one wireless functional device using the at least one wireless function.

19. An interface system as recited in claim 1, in which the application programming interface defines:
a plurality of wired functions for each wired functional device, where the application program controls the at least one wired functional device using the plurality of wired functions; and
a plurality of wireless functions for each wireless functional device, where the application program controls the at least one wireless functional device using the plurality of wireless functions.

20. An interface system as recited in claim 1, further comprising at least one driver operatively connected between the peripheral programming interface and at least one of at least one wired functional device and at least one wireless functional device.

* * * * *